United States Patent
Bhagavan et al.

(10) Patent No.: US 11,144,956 B1
(45) Date of Patent: Oct. 12, 2021

(54) TARGETED MEDIA DELIVERY BASED ON PREVIOUS CONSUMER INTERACTIONS

(71) Applicant: Amazon Technologies, Inc., Seattle, WA (US)

(72) Inventors: Ravi Bhagavan, Seattle, WA (US); Zhun Zhang, Seattle, WA (US); Andrea Larsen, Seattle, WA (US); Zhiyu Du, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 16/276,268

(22) Filed: Feb. 14, 2019

(51) Int. Cl.
   *G06Q 30/00* (2012.01)
   *G06Q 30/02* (2012.01)

(52) U.S. Cl.
   CPC .................. *G06Q 30/0255* (2013.01)

(58) Field of Classification Search
   None
   See application file for complete search history.

(56) References Cited

U.S. PATENT DOCUMENTS

| | | | |
|---|---|---|---|
| 8,156,520 B2 * | 4/2012 | Casagrande | H04N 21/44016 725/32 |
| 8,434,103 B2 * | 4/2013 | Tsuchida | H04N 5/76 725/34 |
| 9,799,055 B1 * | 10/2017 | Rospo | G06Q 30/0255 |
| 9,940,583 B1 * | 4/2018 | Pillai | G06Q 10/10 |
| 10,002,373 B1 * | 6/2018 | Voskamp | G06Q 30/0601 |
| 10,089,650 B1 * | 10/2018 | McClintock | G06Q 30/0255 |
| 10,198,749 B1 * | 2/2019 | Haskin | G06Q 10/0833 |
| 10,290,022 B1 * | 5/2019 | Canavor | G06Q 30/0255 |
| 10,650,414 B1 * | 5/2020 | Delker | G06Q 30/0269 |
| 10,902,474 B2 * | 1/2021 | Lo | H04N 21/812 |

(Continued)

FOREIGN PATENT DOCUMENTS

| | | | | |
|---|---|---|---|---|
| EP | 2071534 A1 * | 6/2009 | | G06Q 30/02 |
| GB | 2468429 A * | 9/2010 | | G06Q 30/02 |

(Continued)

OTHER PUBLICATIONS

Lumen. Introduction to Social Media and Digital Marketing. (Dec. 21, 2012). Retrieved online Jul. 13, 2021. https://courses.lumenlearning.com/boundless-marketing/chapter/introduction-to-social-media-and-digital-marketing/ (Year: 2012).*

(Continued)

*Primary Examiner* — James A Reagan
(74) *Attorney, Agent, or Firm* — Lee & Hayes, P.C.

(57) ABSTRACT

This disclosure describes systems, devices, and techniques related to generating audiences for media campaigns based on previous consumer behavior. In some examples, a query is received from at least one provider device. The query may indicate at least one characteristic of interactions between consumer accounts and items offered by an online marketplace. Audience identifiers can be retrieved from at least one database corresponding to the query. In some cases, the audience identifiers indicate a set of consumer accounts that have previously interacted with one or more items according to the characteristic(s) specified by the query. An indication of the audience identifiers can be output to the provider.

20 Claims, 15 Drawing Sheets

(56) References Cited

U.S. PATENT DOCUMENTS

| | | | | |
|---|---|---|---|---|
| 2007/0027751 | A1* | 2/2007 | Carson | G06F 40/30 |
| | | | | 705/14.46 |
| 2008/0097843 | A1* | 4/2008 | Menon | G06Q 30/0244 |
| | | | | 705/14.1 |
| 2009/0171780 | A1* | 7/2009 | Aldrey | G06Q 30/02 |
| | | | | 705/14.69 |
| 2010/0299702 | A1* | 11/2010 | Lo | H04L 12/189 |
| | | | | 725/39 |
| 2011/0219402 | A1* | 9/2011 | Candelore | H04N 7/025 |
| | | | | 725/34 |
| 2011/0225046 | A1* | 9/2011 | Eldering | G06Q 30/0255 |
| | | | | 705/14.53 |
| 2012/0144420 | A1* | 6/2012 | Sordo | H04N 21/4383 |
| | | | | 725/35 |
| 2012/0330756 | A1* | 12/2012 | Morris | G06Q 50/01 |
| | | | | 705/14.66 |
| 2014/0189732 | A1* | 7/2014 | Shkedi | H04N 21/25891 |
| | | | | 725/34 |
| 2015/0149279 | A1* | 5/2015 | Kotecha | G06Q 30/0255 |
| | | | | 705/14.53 |
| 2015/0269629 | A1* | 9/2015 | Lo | H04N 21/85406 |
| | | | | 705/14.66 |
| 2016/0092564 | A1* | 3/2016 | Srivastava | G06F 16/3326 |
| | | | | 707/722 |
| 2016/0162924 | A1* | 6/2016 | Rathod | G06Q 30/0217 |
| | | | | 705/14.19 |
| 2016/0255139 | A1* | 9/2016 | Rathod | H04L 51/046 |
| | | | | 709/203 |
| 2018/0060857 | A1* | 3/2018 | Wilkinson | G06Q 30/06 |
| 2019/0052701 | A1* | 2/2019 | Rathod | H04L 67/22 |
| 2020/0202408 | A1* | 6/2020 | Raviv | G06K 9/00456 |

FOREIGN PATENT DOCUMENTS

| | | | | |
|---|---|---|---|---|
| JP | 2013127642 A | * | 6/2013 | H04W 4/029 |
| JP | 2013258746 A | * | 12/2013 | H04N 21/47 |
| JP | 2014035768 A | * | 2/2014 | G06Q 30/02 |
| JP | 2014078995 A | * | 5/2014 | H04N 21/812 |
| JP | 2018078617 A | * | 5/2018 | H04N 21/812 |

OTHER PUBLICATIONS

Thomas H. Davenport et al. Know What Your Customers Want Before They Do. (Dec. 2011). Retrieved online Jul. 13, 2021. https://hbr.org/2011/12/know-what-your-customers-want-before-they-do (Year: 2011).*

ARTS White Paper. The Internet of Things in Retail. (Feb. 8, 2017). Retrieved online Jul. 13, 2021. https://cdn.nrf.com/sites/default/files/2018-10/ARTS_IoTQperations_TechnicalReport_20170208_FINAL.pdf (Year: 2017).*

Lee Mcguigan. Selling The American People: Data, Technology, And The Calculated Transformation Of Advertising. (2018). Retrieved online Jul. 13, 2021. https://repository.upenn.edu/cgi/viewcontent.cgi?article=4945&context=edissertations (Year: 2018).*

* cited by examiner

TARGETED MEDIA DELIVERY BASED ON PREVIOUS CONSUMER INTERACTIONS

BACKGROUND

Consumers are increasingly shopping for items in an online environment, such as via websites or mobile applications. Various behaviors of consumers can be noted by the online environment. For example, the online environment can track what sort of items are being purchased, when those items are being purchased, and the like. These behaviors can provide helpful insights into the preferences of the consumers.

Various entities utilize media campaigns to provide media items (such as advertisements, public service announcements, and the like) directly to an audience (e.g., consumers). In some cases, the media items identify or promote various items (e.g., products, services, etc.). In some cases, these media items are provided automatically to the audience, regardless of whether the audience requests the media items and/or the items in which they promote. While these techniques can increase the number of people who experience the media items and increase the frequency in which the corresponding items are viewed by consumers, indiscriminately selecting the audiences can be costly and inefficient. Various resources associated with systems and devices (e.g., servers, consumer devices, etc.) that receive, create, maintain, send, etc., the media items can be overburdened. The resources may include, for example, energy usage, processing power, device storage, network bandwidth, and so on.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
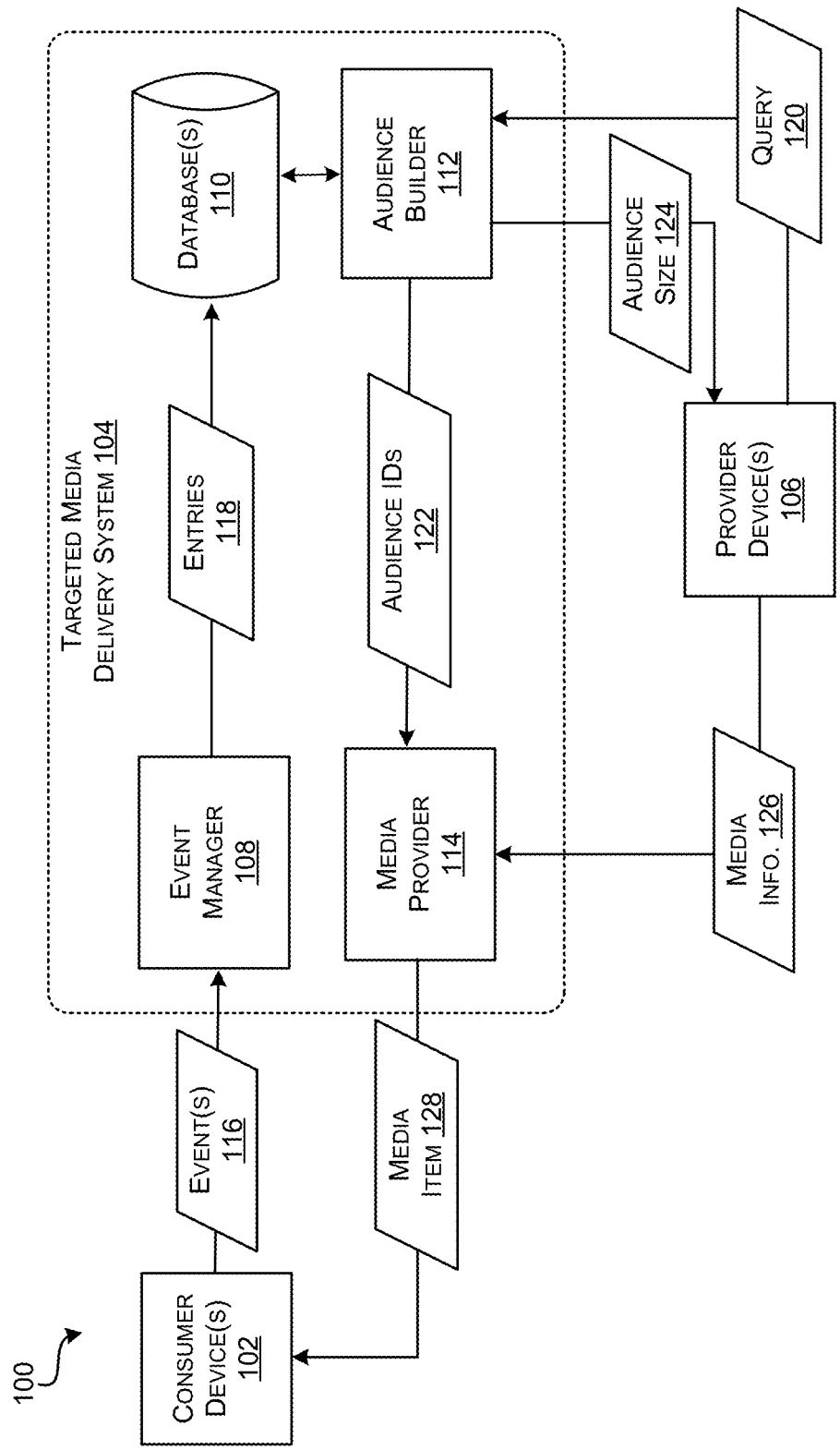
FIG. 1 illustrates an environment for performing targeted media delivery according to implementations of the present disclosure.

This disclosure describes various systems, devices, and methods for generating specific audiences for media campaigns based on previous behavior of consumers. In various implementations, audience members are selected based on previous interactions with items offered for acquisition (e.g., sale, lease, rent, etc.) via an online marketplace, which is accessible via a website and/or a mobile application.

In particular cases, a target audience can be generated in response to receiving a query from a provider. The query can specify one or more characteristics of previous interactions between consumers in the target audience and items offered for sale on the online marketplace. The query can identify item-specific identifiers that are considered in the process of generating the target audience. The query can also identify a time range of interactions that should be considered. In some examples, the query can specify the type of interactions that should be considered.

In response to receiving the query, a set of consumer identifiers corresponding to the target audience can be extracted from at least one database. The consumer identifiers may correspond to consumers who have previously interacted with items according to the characteristics specified by the query. Such interactions may correspond to consumers searching for, selecting, viewing, adding to a saved-items list (e.g., a wishlist), acquiring (e.g., purchasing), submitting a review for, etc., various items via a website and/or mobile application. The database(s) can include entries corresponding to pre-processed data reflecting a large number of previous interactions between consumers and items. However, in some cases, the entries can be organized (e.g., indexed) according to the types of characteristics that are specified by the query. Accordingly, the consumer identifiers corresponding to the query can be retrieved quickly and efficiently.

Once the consumer identifiers in the target audience are identified, in some implementations, the target audience can be reported to the provider. In some implementations, an approximation of the audience size can be output on a device associated with the provider. For example, a range including the audience size can be reported to the provider.

According to various implementations, a media campaign can be initiated based on the target audience. In some cases, the provider can indicate a media item that should be delivered to the target audience, which was generated based on the query. The media item can then be delivered to devices associated with the target audience.

In particular implementations, raw data reflecting interactions between consumers and items can be preprocessed and stored in the database(s). For example, an event stream, which includes raw data corresponding to interactions between consumer accounts and items on the online marketplace, can be received. The consumer accounts can be anonymized by generating anonymous identifiers corresponding to the consumer accounts. Specific characteristics of the interactions, such as the time of the interactions, the categories of items being interacted with, the sources of the items, and the like, can be extracted from the event stream. Some interactions, such as those corresponding to potentially embarrassing or sensitive shopping behavior, can be discarded. Undiscarded interactions can be packaged into entries that include anonymous identifiers corresponding to the consumer accounts and the characteristics of the interaction. The entries can be stored in the database(s). In some instances, prior to collecting information relating to consumer interaction with items, the consumers may opt in or approve of such collection of data.

Various implementations disclosed herein provide a number of advantages over other techniques for identifying target audiences, such as techniques that define audiences according to demographics. Demographics are not necessarily the best way of defining a group of individuals who are most likely to respond positively to a particular media item. Demographics do not necessarily correlate to taste, real-time needs, or purchasing habits. For example, even if a provider were to determine that women between the ages of 18-30 are most of their clients, the provider's products or services may only apply to a small percentage of women in that particular demographic. Thus, by defining audiences using demographics, alone, the provider could be delivering a media item to a number of people that are unlikely to purchase products or services emphasized by the media item. By defining audiences based on previous interactions with items, implementations disclosed herein can more efficiently target audiences that are likely to be interested in materials that are emphasized by media items provided to those audiences.

Various implementations disclosed herein provide a number of advantages over other techniques for defining audiences according to behavior. In some of these techniques, when the audience is generated based on unprocessed purchasing data, a significant amount of time and processing power may be required to generate the audience on-demand. Accordingly, a media campaign may be significantly delayed between a time at which the media campaign is requested and a time at which a behavior-based audience for the media campaign is received. Such a delay is particularly problematic when the targeted audience can change rapidly or periodically, and/or in the case of short-term media campaigns. By pre-processing data associated with the interacts in advance of generating audiences, the members of the audience can be retrieved quickly and efficiently.

In addition, particular implementations improve the privacy of audience members. For example, by anonymizing consumer accounts in the stored entries, systems can share media items with a target audience without publicizing behaviors associated with any particular member of the audience. Moreover, by disregarding behaviors associated with sensitive or embarrassing items, the privacy of the users can be further enhanced.

Example implementations are described with reference to the following figures.

FIG. 1 illustrates an environment 100 for performing targeted media delivery according to implementations of the present disclosure. As illustrated, the system 100 includes consumer device(s) 102, targeted media delivery system 104, and provider device(s) 106. The targeted media delivery system 104 may include an event manager 108, database(s) 110, an audience builder 112, and a media provider 114.

Individuals using an online marketplace may use the online marketplace to search for, research, purchase, rent, or otherwise interact with items offered by the online marketplace, possibly on behalf of merchants. According to various implementations of the present disclosure, data indicative of various interactions with the items can be tracked and pre-processed. The pre-processed data can be subsequently used to build a target audience for a media campaign.

Consumer device(s) 102 may be utilized by individuals to interact with various items offered for sale in an online marketplace. Any of consumer device(s) 102 can be implemented as any suitable type of computing device configured including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, a smart home device, an in-vehicle (e.g., in-car) computer, and/or any similar mobile device, as well as situated computing devices including, without limitation, a television (smart television), set-top-box (STB), desktop computer, an IoT device, and the like. In various implementations, any of consumer device(s) 102 can include one or more hardware components by which information can be output, such as a display screen, an audio speaker, haptic feedback devices, and the like. In particular implementations, any of the consumer device(s) 102 can include one or more hardware components by which information can be input, such as a touch sensor, a mouse, a keypad, a microphone, and the like. Consumer device(s) 102 may also be configured to transmit data to and receive data from remote devices over wired and/or wireless networks.

Although the terms "item(s)" and "product(s)" are used interchangeably throughout this document, it is contemplated that the terms "item(s)" and "product(s)" may correspond to products and/or services. In particular implementations, an item is available for purchase. In certain examples, information about an item (e.g., popularity of the item, a source of the item, reviews about the item, details about the item, etc.) can also be available for review by the consumer device(s) 102.

As used herein, the terms "items offered for sale," "items offered," and their equivalents, can refer to products or services that are, have been, or will be offered for sale, lease, rent, and/or consumption. In some cases, items are available for consumption as part of a subscription service. For example, an item can be a digital video available for consumption as part of a video streaming subscription service. In some cases, an item can be out-of-stock or otherwise unavailable for consumption. For example, an item can be a product that has been sold out or that is available for pre-order. In particular implementations, items can be physical products (e.g., clothing) that can be shipped, digital products (e.g., digital music) available for download, memberships to subscription services (e.g., video streaming services), services (e.g., plumbing services) that can be provided by a deployed individual, or any other product or service that can be provided via the use of an online marketplace.

The terms "online marketplace" or "marketplace," or their equivalents, as used herein, can refer to a website, mobile application, and/or user interface by which individuals can research, purchase, and/or discover items. In certain implementations, an online marketplace can be accessed via the Internet, and is hosted by one or more remote devices (e.g., servers). In some cases, the online marketplace is implemented via a graphical user interface that can be displayed on a consumer device 102 and may include multiple user interface elements that can be selected and/or manipulated by an individual using the consumer device 102 in order to navigate through the online marketplace. An online marketplace, in particular implementations, may display a virtual page (e.g., a webpage) associated with a particular item, and a user can interact with the particular item by interacting with one or more user interface elements on the page. In certain examples, the online marketplace has a search feature, by which individuals can input one or more keywords to search the marketplace for information about an item, a provider of the item, and the like.

In some cases, an individual may login to an account (e.g., a "consumer account" or "consumer profile") with the marketplace on a respective consumer device and interact with an item via the respective consumer device. The term "account," as used herein, can refer to an arrangement between an individual and a marketplace by which the individual is given personalized access to the marketplace. An individual may login to an account by an authentication process. For example, an individual may access a consumer account associated with the individual by entering a username and password via user interface associated with the marketplace. An account may store various settings, histories, saved-items lists, shopping cart lists, preferences, and the like, associated with a given individual. In some cases, an account of an online marketplace can be associated with an account of a different website or mobile application, such as a social media account. In some implementations, multiple individuals may share the same consumer account.

An interaction between a consumer device 102 and the item may take a number of forms. In some examples, the individual might utilize a user interface of the online marketplace to perform at least one of searching for an item using a search tool, viewing a webpage associated with the item, selecting the item for purchase, adding the item to a virtual "shopping cart" (e.g., a list of one or more items offered for purchase on the online marketplace that the individual could save for purchase at a later time), adding the item to a virtual saved-items list (e.g., a list of one or more items that the individual can view at a later time), submitting a review for the item, purchasing the item, or the like. In some embodiments, an individual may control the user interface of the online marketplace by issuing a voice command to the individual's respective consumer device 102. One or more microphones of the consumer device(s) 102 may detect the audio corresponding voice command and generate an audio signal that is representative of the audio data. Using one or more speech recognition techniques (e.g., automated speech recognition (ASR)), words or phrases of the voice command may be identified. Various language processing (NLP) techniques, such as natural language understanding (NLU), may be applied to the identified words/phrases to determine an intent associated with the voice command. Based on that intent, the interaction with the item can be determined.

When a consumer account interacts with an item, at least one event 116 is generated and transmitted to the targeted media delivery system 104. In some examples, a corresponding consumer device 102 generates the event 116 that is transmitted to the targeted media delivery system 104. In some cases, the event 116 is generated and transmitted to the targeted delivery system 104 by one or more additional devices (not pictured) that manage the online marketplace and are connected to the consumer device(s) 102. The event 116 may include data indicative of the interaction between the consumer account and the item. In particular, the event 116 is transmitted to the event manager 108 in the targeted media delivery system 104. In some implementations, events including the event 116 are continuously or periodically transmitted to the event manager 108 in the form of a stream of data. This stream can be referred to as an "event stream."

An event stream can include a significant amount of information, some of which may not be helpful for selecting target audiences for particular media campaigns. For example, an event stream may include information about payment options utilized by consumer accounts, return information, contact information, and the like. While this information can be helpful in the overall management of the online marketplace, this information may not be utilized in audience building. As a result, it may be relatively inefficient to parse raw event stream data to analyze consumer behavior for the purpose of selecting an audience for a media campaign. In addition, the event stream may include information about interactions between accounts and items that individuals may want excluded from consideration in media campaigns. For example, individuals may want to keep their purchase behavior regarding health-related items private. Furthermore, in some cases, the event stream may include private information, such as personally identifying information about accounts or individuals utilizing the consumer device(s) 102. If the individuals have an expectation that their behavior will be maintained privately by the online marketplace, the raw data of the event stream cannot be shared with a third party (e.g., an entity seeking to implement a media campaign) without violating that expectation. In various implementations, these and other problems can be addressed by the event manager 108.

The event manager 108 may receive the event 116, generate entries 118 by pre-processing the events 116, and store the entries 118 in database(s) 110. In various implementations, in response to receiving a particular event 116, the event manager 108 may extract one or more features of the particular event 116 and generate the entries 118 based on the extracted features.

In particular implementations, the event manager 108 may discard events 116 associated with particular items. In some implementations, the event manager 108 may maintain, or may have access to, a blacklist of items that should be ignored in the process of building a target audience. The blacklist may include a list of indications of sensitive items, such as health-related items. Health-related items can refer to items in categories such as medical devices, medical supplies, medications, supplements, genetic tests, books about medical conditions, diagnostic tests, and the like. In some cases, the blacklist may include some health-related items, but not other health-related items. For example, the blacklist may include diagnostic tests, topical treatments, over-the-counter medications, and other highly sensitive items, but may exclude herbal supplements, non-prescription pain relievers, and the like.

In some cases, the event manager 108 may build the blacklist by automatically adding indications of any item offered for sale in the online marketplace within a health and personal care category to the blacklist. In certain implementations, the event manager 108 may maintain a list of keywords, and when a new item is added to the online marketplace that includes a description including one or more of the keywords, an indication of the new item is added to the blacklist. In some examples, predictive analytics can be used to generate the blacklist. In particular instances, the event manager 108 may learn keywords listed on pages indicating health-related items. For example, the event manager 108 may utilize a machine learning model (e.g., a Bayes classifier model, a k-nearest neighbor algorithm model, a random forest, etc.) to ascertain that phrases such as "doctor-recommended," "hospital-approved," "treatment for," etc., are likely (e.g., more than 80% likely) to indicate that a particular webpage is associated with a health-related item. In some cases, the event manager 108 can be initialized by an initial blacklist of items, and the event manager 108 can scour pages associated with items in the initial blacklist to develop a set of keywords indicative of the blacklisted items. In some examples, the event manager 108 may engage in the process of learning the keywords periodically (e.g., at midnight every evening), or in response to certain events (e.g., more than a specified number of items have been added to the online marketplace since the least keyword learning process occurred). When a new item is added to the online marketplace, the event manager 108 may determine whether to classify the new item into the blacklist based on whether one or more of the set of keywords appears in a page or description associated with the new item. According to some implementations, the event manager 108 is able to maintain a relatively up-to-date list of blacklisted items using automated processes.

In some examples, the blacklist may include a list of diagnostic tests offered for sale by the online marketplace, such that when a consumer account purchases a diagnostic test (e.g., a pregnancy test) and an event 116 is generated based on the purchase of the diagnostic test, the event 116 is not considered in an audience building process. By discarding events 116 associated with sensitive items, individuals can be prevented from being defined as audiences in potentially embarrassing or unappreciated media campaigns.

In some examples, the event manager 108 may derive a consumer identifier corresponding to an account identifier and or a device identifier based on the particular event 116. The account identifier may correspond to a name or some other unique identifier that indicates the consumer account. The device identifier may correspond to a location or address of a device utilized by the consumer account, such as an internet protocol (IP) address, a media access control (MAC) address, or the like. In certain implementations, the consumer identifier is at least pseudo-anonymized, so that the account identifier and/or device identifier cannot be easily derived from the consumer identifier. In particular implementations, the event manager 108 can store and utilize an encryption key that can be used to derive anonymous identifiers from consumer accounts and/or device identifiers. The encryption key can include any of a cryptographic hash function, a hash chain, a universal one-way hash function, a code (e.g., a codebook), a cipher (e.g., a Feistel cipher, a stream cipher, a symmetric key, an asymmetric key, a block cipher, etc.), and the like. For example, a consumer account referred to by the account identifier "John_Doe" and associated with a device identifier corresponding to the Internet Protocol (IP) address 222.22.222.1, can be anonymized into a random string, such as "1A4423," by the event manager 108.

In particular implementations, the event manager 108 and other elements of the targeted media delivery system 110 (e.g., the audience builder 112 and the media provider 114), may exclusively maintain the consumer identifiers as anonymous identifiers. The event manager 108 may refrain from de-anonymizing the consumer identifiers or from maintaining a data structure (e.g., a decryption key, a function, a table, a code, a cipher, etc.) that can be used to de-anonymize the consumer identifiers. Accordingly, anonymity of specific behaviors associated with the consumer accounts can be enhanced.

In some implementations, the event manager 108 may include functionality to de-anonymize the anonymous consumer identifiers. However, this functionality may only be applied to consumer accounts that have opted in to the functionality. In some examples, a consumer account may opt in to the functionality only after being informed of possible privacy risks.

In some examples, the event manager 108 may maintain a decryption key that can be used to derive non-anonymized consumer account identifiers and/or device identifiers from the anonymized consumer identifiers. In certain cases, the event manager 108 may maintain a list of anonymized consumer identifiers correlated with associated non-anonymized consumer account identifiers and/or device identifiers. In certain implementations, the event manager 108 may maintain a hash table that associates anonymous identifiers to consumer accounts and/or device identifiers identifying devices associated with the consumer accounts. For example, the anonymous identifiers may be keys in the hash table and names of the consumer accounts may be entries stored in buckets in the hash table. In some implementations, a hash function may generate a single index corresponding to a single bucket for each key.

In some cases, the event manager 108 may maintain a function that can be used to derive the consumer accounts and/or device identifiers from the anonymized consumer identifiers. In some implementations, the event manager 108 may store a reverse function, a code (e.g., a codebook, etc.), and/or a cipher (e.g., a Feistel cipher, a stream cipher, a symmetric key, an asymmetric key, a block cipher, etc.) that can be used to de-anonymize consumer identifiers. For example, the event manager 108 may utilize a particular cipher to decrypt an anonymous consumer identifier into a consumer account that corresponds to the anonymous consumer identifier.

In certain implementations, the event manager 108 may return a name of a consumer account in response to receiving an inquiry about the corresponding anonymous identifier. For example, the media provider 114 may transmit anonymous identifiers to the event manager 108, the event manager 108 may derive the names of the consumer accounts and/or indicators of the devices utilized by the consumer accounts corresponding to the one or more anonymous identifiers based on the table, reverse function, code, and/or cipher, and the event manager 108 may transmit the names and/or indicators to the media provider 114. In particular examples, the event manager 108 may transmit at least a portion of the reverse function, the code, and/or the cipher to the media provider 114, so that the media provider 114 can de-anonymize the consumer identifiers using local processing capabilities.

According to various implementations, the event manager 108 may derive one or more characteristics or features of a particular interaction from the event 116. The terms "characteristic" and "feature" can be used interchangeably to refer to any descriptor of the item that is interacted with, a source of the item, a category of the item, a time in which the interaction took place, a type of the interaction, and the like.

In certain examples, the event manager 108 may derive an item identifier that identifies the item interacted with by the consumer account based on the particular event 116. The item may be identified by a code, a number, a string, or any other suitable identifier. For example, the events manager 108 may determine that the consumer account indicated by account identifier John_Doe interacted with item "Z Shoes."

In some cases, the event manager 108 may derive a source of the item based on the particular event 116. In some implementations, the event manager 108 may derive a brand associated with a manufacturer of the item. For example, the event manager 108 may determine that "Z Shoes" are manufactured and offered for sale by "Brand A."

In particular implementations, the event manager 108 may determine a category of the item based on the particular event 116. The category may include any number of subcategories, in certain examples. For example, the event manager 108 may determine that "Z Shoes" are part of an "apparel" category, and a "footwear" subcategory within the apparel category.

The event manager 108 may also derive a time identifier indicating a time that the interaction took place based on the particular event 116. In some cases, the time may indicate at least one of a general time of day (e.g., from 9 AM to 5 PM), a specific time of day (e.g., 9:32:24), a general date (e.g., December), or a specific date (e.g., Dec. 24, 2019). For example, the event manager 108 may determine that consumer account John_Doe interacted with Z Shoes in the online marketplace at 9:32:24 on Dec. 24, 2019.

In particular implementations, the event manager 108 may further derive an interaction identifier based on the particular event 116. In certain examples, the interaction identifier may be "awareness," which indicates that a consumer account has searched for the item, viewed a webpage associated with the item, or is otherwise aware of a particular item. In some examples, the interaction identifier may be "consideration," which indicates that a consumer account has taken at least one step to purchase the item (e.g., the consumer account has added the item to a shopping cart) or save the item for further consideration (e.g., the consumer account has added the item to a saved-items list). In particular examples, the interaction identifier may be "purchase," which indicates that a consumer account has purchased, rented, or participated in some transaction in which the consumer account has a right to obtain a particular item. In some cases, the event manager 108 may determine that the interaction included at least one of a keyword search, a page view corresponding to an item, an item added to a virtual shopping cart, an item added to a list of saved items, a review submitted for an item, an item purchase, or the like. For example, the event manager 108 may determine that consumer account John_Doe purchased Z Shoes in the online marketplace.

Various features derived from a particular event 116 (such as any of the consumer identifier, the item identifier, the item source, the item category, the time identifier, and the interaction identifier) can be packaged into an entry 118. The event manager 108 may store the entry 118 in the database(s) 110. In some implementations, the event manager 108 may generate new entries 118 and store the entries 118 whenever the event manager 108 receives new events 116.

In some cases, the event manager 108 actively manages the database(s) 110. In particular implementations, the event manager 108 deletes entries 118 that are stored in the database(s) 110 according to predefined rules. In various implementations, the event manager 108 may delete entries 118 associated with an interaction time that is older than a predetermined age. For example, the event manager 108 may delete an entry 118 corresponding to the purchase of Z Shoes that occurred on Dec. 24, 2019 when the event is over one month old (i.e., on or after Jan. 24, 2020). In certain examples, the event manager 108 may delete entries 116 from the database(s) 110 periodically (e.g., once a day) or may delete entries 116 in response to determining a free memory capacity of the database(s) is less than a threshold capacity.

The database(s) 110 may store the entries 118 received from the event manager 108. In some cases, the entries 118 are stored in a table that is indexed by a particular feature that is a possible characteristic for deriving an audience based on behavior. Features and characteristics may include, for example, at least one of a consumer identifier (e.g., an anonymous identifier of a consumer account), an item identifier (e.g., a string that uniquely identifies the item among all items offered by the online marketplace), an item source (e.g., an identifier of a brand or a manufacturer of the item), an item category (e.g., an identifier of a type of item), an interaction identifier (e.g., the type of interaction between the item and the consumer account), a time identifier (e.g., a time of day, a date, etc.), and the like. The entries 118 may be indexed by a feature other than consumer identifier. For example, the entries 118 may be indexed by item identifier.

In some implementations, the database(s) 110 store the entries 118 in the form of one or more multimaps (e.g., multihashes, a multidicts, etc.), or any another type of associative array in which more than one value is associated with a particular key. In particular instances, features are defined as keys in a multimap, and multiple consumer identifiers can be returned for a given feature. For example, multiple consumer identifiers can be associated with consumer accounts that may have previously interacted with "Brand Z" items. In a multimap indexed by item source, the multiple consumer identifiers can be returned when "Brand Z" is specified as the key. In certain cases, the database(s) 110 can store multiple multimaps, where any one multimap is indexed by a particular type of feature and/or characteristic. For example, one multimap may accept item sources as keys, another multimap may accept item categories as keys, and the like.

In various implementations, the entries 118 stored in the database(s) 110 can be used to efficiently generate an audience based on previous consumer behavior. The audience may be generated based at least in part on actions performed by the provider device(s) 106 and the audience builder 112.

In various examples, a provider may intend to target an audience in a media campaign. The provider may be a media provider, a company selling products, a government agency, or any other entity seeking to initiate a media campaign. In some examples, the provider may be initiating the media campaign in order to encourage the audience to engage in particular behaviors. For instance, the media campaign may be designed to encourage the audience to watch specified media content, to purchase particular products, to engage in public health programs, or the like. In some cases, defining the audience based on previous behaviors may be the most efficient way to influence future behaviors. Accordingly, in particular implementations, the provider may define and seek an audience based on previous interactions between audience members and items that are offered by the online marketplace.

The provider may be associated with the provider device(s) 106. Any of the provider device(s) 106 can be implemented as any suitable type of computing device configured including, without limitation, a mobile phone (e.g., a smart phone), a tablet computer, a laptop computer, a PDA, a wearable computer (e.g., electronic/smart glasses, a smart watch, fitness trackers, etc.), an IoT device, a smart home device, an in-vehicle (e.g., in-car) computer, and/or any similar mobile device, as well as situated computing devices including, without limitation, a television (smart television), STB, desktop computer, IoT device, and the like. In various implementations, any of the provider device(s) 106 can include one or more hardware components by which information can be output, such as a display screen, an audio speaker, haptic feedback tools, and the like. In particular implementations, any of the provider device(s) 106 can include one or more hardware components by which information can be input, such as a touch sensor, a mouse, a keypad, a microphone, and the like. The provider device(s) 106 may also be configured to transmit data to and receive data from remote devices over wired and/or wireless networks. For example, the provider device(s) may transmit the query 120 to the audience builder 112 over one or more networks.

The provider device(s) 106 may request an audience for a media campaign by transmitting a query 120 to the audience builder 112. The query 120 may specify one or more characteristics of previous interactions participated in by the audience. The one or more characteristics may identify the target audience for the media campaign according to behavior. In some cases, the query 120 may specify any of an item identifier, an item source, an item category, an interaction identifier, or a time identifier corresponding to previous interactions by the audience. For example, the query 120 may identify "Z Shoes" as an item identifier, "Brand A" as the item source, "purchase" as the interaction identifier, and "within the past month, during the hours of 9 AM and 5 PM" as the time identifier.

In response to receiving the query 120, the audience builder 112 may fetch one or more audience identifiers 122 corresponding to the query 120 from the database(s) 110. In particular implementations, the audience builder 112 performs a lookup operation of the entries 118 that are stored in the database(s) 110. In examples in which the entries 118 are stored in at least one multimap, the audience builder 112 and/or the database(s) 110 may accept strings representing the one or more characteristics in the query 120 as keys and utilize one or more hash functions associated with the multimap to return one or more consumer identifiers associated with the keys. In examples in which the database(s) 110 store different multimaps associated with different types of characteristics or features and the audience builder 112 elucidates multiple lists of consumer identifiers associated with multiple characteristics or features specified in the query 120, the audience builder 112 may determine a subset of consumer identifiers that are common across the multiple lists. Accordingly, in some implementations, the audience builder 112 can determine the consumer identifiers that fulfill all of the characteristics specified in the query 120.

The audience identifiers 122 may correspond to a set of consumer identifiers stored in the database(s) 110 corresponding to consumer accounts (e.g., account identifiers indicating consumer accounts) that have previously interacted with items according to the characteristics specified in the query 120. For example, on Jan. 8, 2020, the audience builder 112 may fetch multiple consumer identifiers, including the consumer identifier for consumer account "John_Doe," which purchased Brand A's Z Shoes between the hours of 9 AM and 5 PM between Dec. 8, 2019 and Jan. 8, 2020.

In particular implementations, the audience builder 112 may not share indications of the audience unless the audience is greater than a particular size. In some cases, the audience builder 112 may confirm that the number of the audience identifiers 122 exceeds a threshold. In the event that the number of the audience identifiers 122 does not exceed the threshold, the audience builder 112 may transmit a message to the provider device(s) 106 indicating that the audience is too small for a media campaign. By confirming that the audience is greater than a particular size, the audience builder 112 can inform the provider of the scope of the audience before the provider initiates or purchases the right to initiate a media campaign targeting the audience. The audience builder 112 can also ensure that the audience is large enough to maintain the anonymity of the various consumer accounts associated with the audience identifiers 122.

Once the audience builder 112 has retrieved the audience identifiers 122 and confirmed that the number of audience identifiers 122 exceeds the threshold, the audience builder 112 may transmit an indication of the audience to the provider device(s) 106. In some cases, the indication of the audience is a list of the consumer identifiers or a list of consumer accounts corresponding to the consumer identifiers. In some examples, the audience builder 112 can transmit an indication of an audience size 124 to the provider device(s) 106.

In particular implementations, the indication of the audience size 124 is a range that includes the number of audience identifiers 122 corresponding to the query 120. In some cases, the range can be selected by randomly selecting two random numbers between 0 and ten raised to an order of magnitude corresponding to the number of audience identifiers 122, defining the lower end of the range as the difference between the number of audience identifiers 122 and one of the random numbers, and defining the upper end of the range as the sum of the number of audience identifiers 122 and the other one of the random numbers. For example, a true number of members may be 230, the order of magnitude is two, ten raised to the order of two is 100, the first random number between 0 and 100 is 20, the second random number between 0 and 100 is 86, and the audience range output to the provider device(s) 106 is 210-316.

By outputting the range to the provider device(s) 106, the provider can gain insight into magnitude of a potential target audience, without being provided potentially confidential information about the target audience. The provider can use this information to decide whether to initiate the media campaign, or whether to adjust the requirements of the target audience to increase or decrease the audience size 124.

In particular implementations, the query 120 can be received and/or the audience size 124 can be visually and/or audibly output to the provider device(s) 106 via a user interface. In some cases, the audience builder 112, or some other component of the targeted media delivery system 104, can cause the provider device(s) 106 to visually or audibly output the user interface. The user interface may include one or more selectable elements that correspond to the characteristics specified in the query. The user interface may also output the indication of the audience size 124. In other embodiments, the query submitted by the provider may be audibly uttered as a voice command. One or more microphones of the provider device(s) 106 may detect the audio corresponding voice command and generate an audio signal that is representative of the audio data. Using one or more speech recognition techniques (e.g., ASR), words or phrases of the voice command may be identified. Various NLP techniques, such as NLU may be applied to the identified words/phrases to determine an intent associated with the voice command. Based on that intent, the target audience and/or the audience size 124 may be identified and presented to the provider. For instance, the target audience and/or the audience size 124 may be visually output via the user interface and/or may be audibly output via one or more speakers of the provider device(s) 106.

Accordingly, the provider device(s) 106 may receive information about a potential target audience for a media campaign. Based on the information about the potential target audience, the provider may determine to proceed with initiating a media campaign for the target audience.

In various implementations, a media item 128 can be shared with the consumer device(s) 102 corresponding to the audience identifiers 122. The media item 128 can be shared with the consumer device(s) 102 based at least in part on actions performed by the media provider 114 and the provider device(s) 106. Moreover, the media item 128 may identify an item, product, and/or service that is associated with the provider and/or that is offered for acquisition by the provider.

In some cases, the audience identifiers 122 extracted from the database(s) 110 by the audience builder 112 may be transmitted by the audience builder 112 to the media provider 114 along with identifying information corresponding to the query 120. For example, the audience builder 112 may transmit the list of 230 consumer identifiers with an indication that the audience corresponds to "Media Campaign X" created by "Provider B." The media provider 114 may then be ready to begin a media campaign for the audience specified by the audience identifiers 122.

In particular implementations, the audience identifiers 122 are anonymous consumer identifiers. In various instances, the media provider 114 may be configured to derive at least one of the consumer devices 102 associated with the audience identifiers 122. In some cases, the media provider 114 may refrain from deriving the consumer account identifiers from the audience identifiers 122. The media provider 114 may, for example, refrain from processing or storing information that can be used to derive consumer accounts, thereby maintaining the privacy of specific consumer accounts. In some cases, the media provider 114 may be able to associate the at least one consumer device 102 associated with the audience identifiers 122 without deriving the consumer account names. For example, the media provider 114 may be able to identify that IP address 222.22.222.1 is associated with consumer identifier "1A4423" without determining that the consumer identifier is associated with consumer account "John_Doe."

In some implementations, the media provider 114 may be configured to translate the anonymous identifiers into corresponding consumer account identifiers and/or device identifiers. In some cases, the media provider 114 may receive a translation key from the event manager 108 that the media provider 114 can use to derive the account identifiers. For example, if the audience identifiers 122 include consumer identifier "1A4423," the media provider may utilize the translation key to determine that consumer account "John_Doe" is in the target audience. In some examples, the media provider 114 can transmit the anonymous consumer identifiers to the event manager 108, and the event manager may return a list of account identifiers and/or device identifiers corresponding to the consumer identifiers.

The provider device(s) 106 may specify media that is to be shared in the media campaign by transmitting media information 126 to the media provider 114. In some cases, the media information 126 can be received using the same user interface utilized to input the query 120 and/or used to output the indication of the audience size 124. The media information 126 can include, for example, at least one of an image file, an audio file, a video file, a hyperlink, or the like. For example, the media information 126 may include a string of text and an image that the media provider 114 can use to generate a banner image. In some examples, the media information 126 may include a hyperlink indicating a location where the media item 128 is located. In particular examples, the media information 126 can include a hyperlink that can be linked to a visual media item 128, such that when the media item 128 is output on a particular device, a user can click the media item 128 and be taken to a particular webpage associated with the media campaign. In some cases, the media information 126 specifies a combination of audio and visual information.

In some cases, the media information 126 includes an indication of the campaign and the provider. For example, the media information 126 can indicate that the media corresponds to "Media Campaign X" created by "Provider B." Accordingly, the media provider 114 may associate the media information 126 with the same media campaign as the audience identifiers 122.

In response to receiving a request to initiate the media campaign, or in response to receiving the media information 126, from the provider device(s) 106, the media provider 114 may transmit the media item 128 to one or more of the consumer device(s) 102 corresponding to the audience identifiers 122. The media provider 114 may cause the one or more consumer device(s) 102 corresponding to the audience identifiers 122 to output the media item 128. For example, the media provider 114 may cause multiple consumer devices 102, including the consumer device corresponding to consumer account "John_Doe," to display the banner image generated by the media provider 114. In some examples, the media item 128 can be any of a public service announcement, a communication, a notice, a recommendation, social media content, and the like.

According to various implementations, the targeted media delivery system 104 may generate an audience according to previous behaviors, inform the provider with information about the audience, and perform targeted media delivery to the audience on behalf of the provider.

Figure 2:
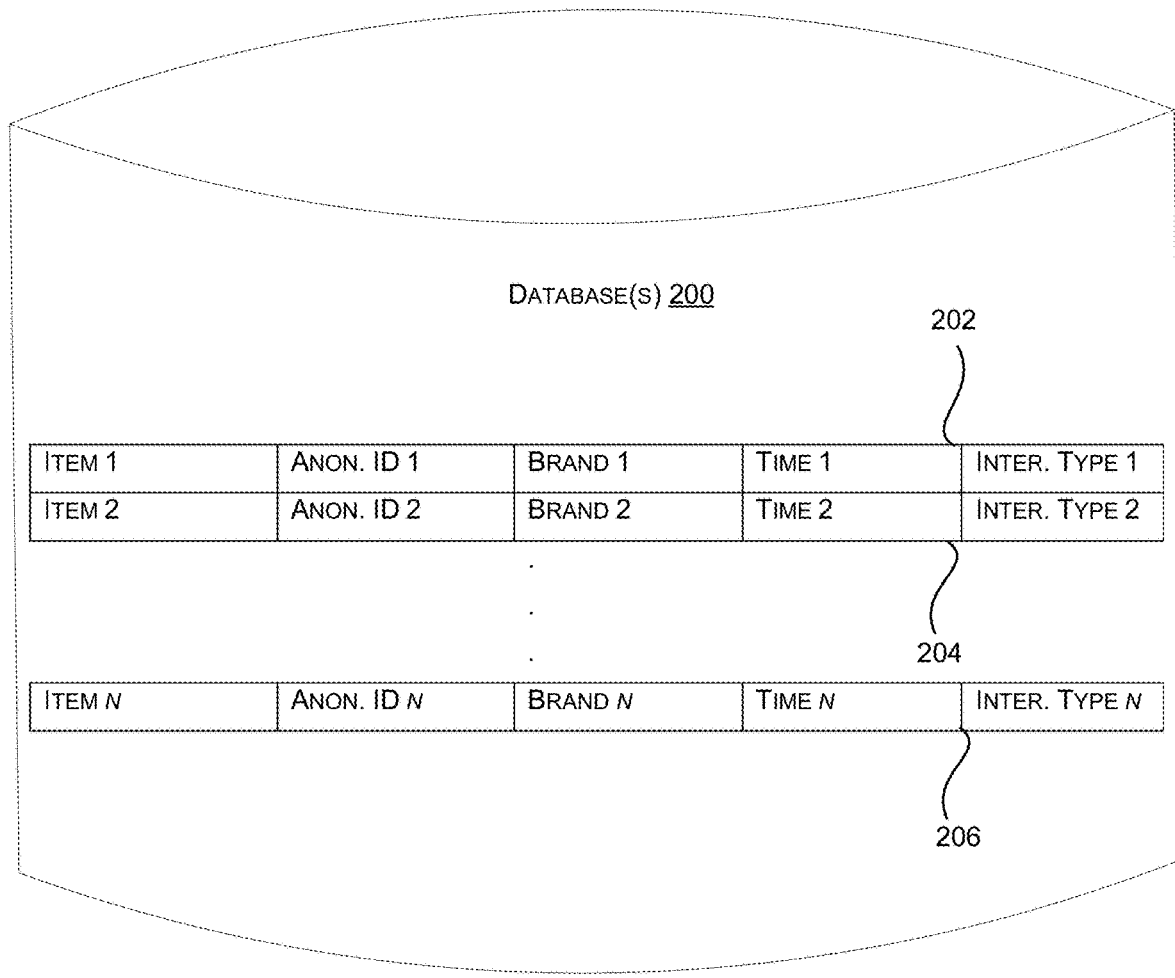
FIG. 2 illustrates database(s) according to various implementations of the present disclosure.

FIG. 2 illustrates database(s) 200 according to various implementations of the present disclosure. In some examples, the database(s) 200 correspond to the database(s) 110 illustrated in FIG. 1 and described above.

The database(s) 200 may store n entries including a first entry 202, a second entry 204, and an nth entry 206. Any one of the first to nth entries 202 to 206 may include multiple characteristics corresponding to a particular interaction between a consumer account and an item. For example, entry 202 may include an Item 1 that a first consumer account interacted with, an Anonymous Identifier 1 corresponding to the first consumer account, a Brand 1 that is a source of the Item 1, a Time 1 that indicates a time, a day, a time range/period, etc. at which the consumer account interacted with Item 1, and an Interaction Type 1 that characterizes the interaction (e.g., a search, a view, a purchase, etc.) between the consumer account and item 1.

In particular implementations, Items 1 through n may correspond to items that are excluded from a blacklist of sensitive items. For example, Items 1 through n may be items that are not health-related items.

In some cases, the database(s) 200 stores relevant entries and excludes irrelevant entries. For example, the database(s) 200 may store entries corresponding to interaction times that have occurred within a particular threshold time period (e.g., one month). In some cases, entries that become irrelevant may be deleted from the database(s) 200. For example, if any of the entries 202 to 206 corresponds to an interaction time that has occurred outside of the particular threshold time period (e.g., the entry is older than one month), they may be deleted from the database(s) 200 or migrated to a different database.

In some implementations, the n entries can be stored in the form of at least one multimap, wherein one or more characteristics can be associated with multiple anonymous identifiers. In some cases, the multimap can be a multihash or a multidict. For example, if Item 1 has been interacted with by multiple consumer accounts during the threshold time period, entry 202 can list multiple anonymous identifiers (including Anonymous Identifier 1) respectively associated with the multiple consumer accounts. Accordingly, in certain implementations, the database(s) 200 can efficiently return a list of anonymous identifiers that have interacted with items according to a particular characteristic. According to particular implementations, the database(s) 200 may store multiple multimaps respectively associated with characteristics relevant to audience building. For example, the database(s) 200 may store a first multimap indexed by item, a second multimap indexed by item source, and so on.

FIGS. 3A to 3E illustrate an example of a user interface used to specify a query that can be output on a provider device (e.g., any of provider device(s) 106 illustrated in FIG. 1). In the example illustrated in FIGS. 3A to 3E, provider may be interested in initiating a media campaign targeted to consumers who have previously purchased Z Shoes, provided by Brand A, on an online marketplace within the past 30 days. FIGS. 3A to 3E show various implementations of pages and user interfaces that the provider can use to establish the appropriate audience for the media campaign.

Figure 3A:
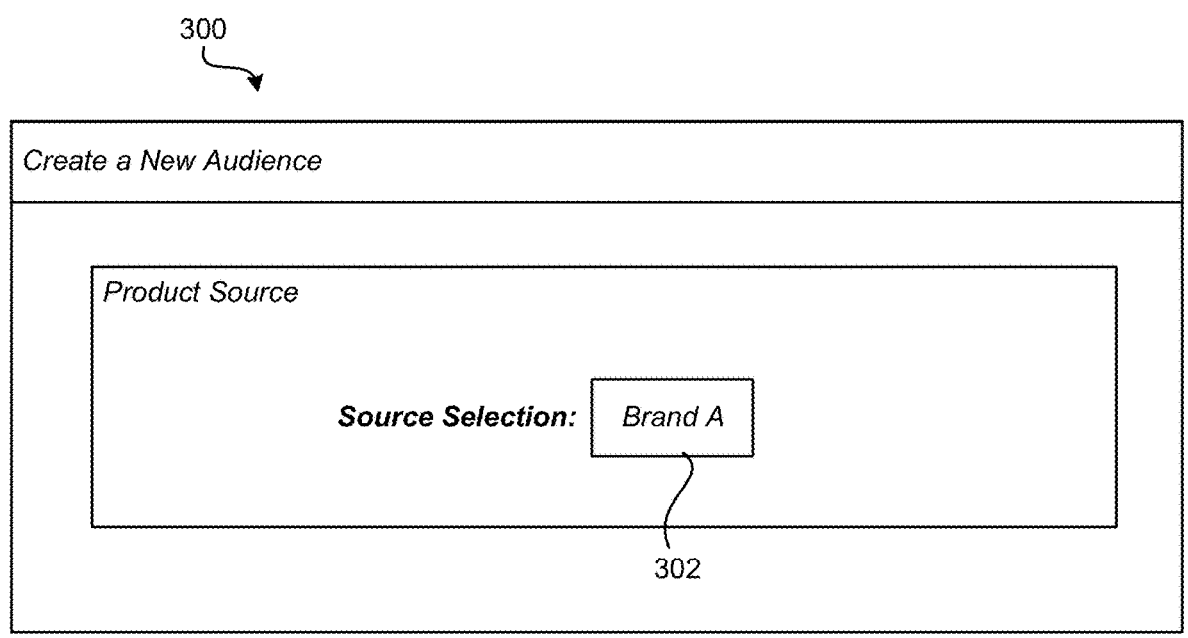
FIGS. 3A to 3E illustrate an example of a user interface used to specify a query that can be output on a provider device.

FIG. 3A illustrates a first page 300 of the user interface according to an implementation. The first page 300 includes a first selection element 302 that can correspond to a selectable item source corresponding to a target audience. As illustrated in FIG. 3A, the first selection element 302 includes a text box corresponding to an item source. Using the first selection element 302, a provider can input a particular item source of items that the target audience has previously interacted with.

In the implementation illustrated in FIG. 3A, the provider has selected "Brand A" as the item source. As a result of the provider's selection, an audience including consumer identifiers for consumer accounts that have interacted with Brand A items via the online marketplace can be generated. Although a text box is illustrated in FIG. 3A, it is contemplated that the item source can be input in any manner, such as via freeform text, a drop-down menu, a list of potential item sources, and so on.

Figure 3B:
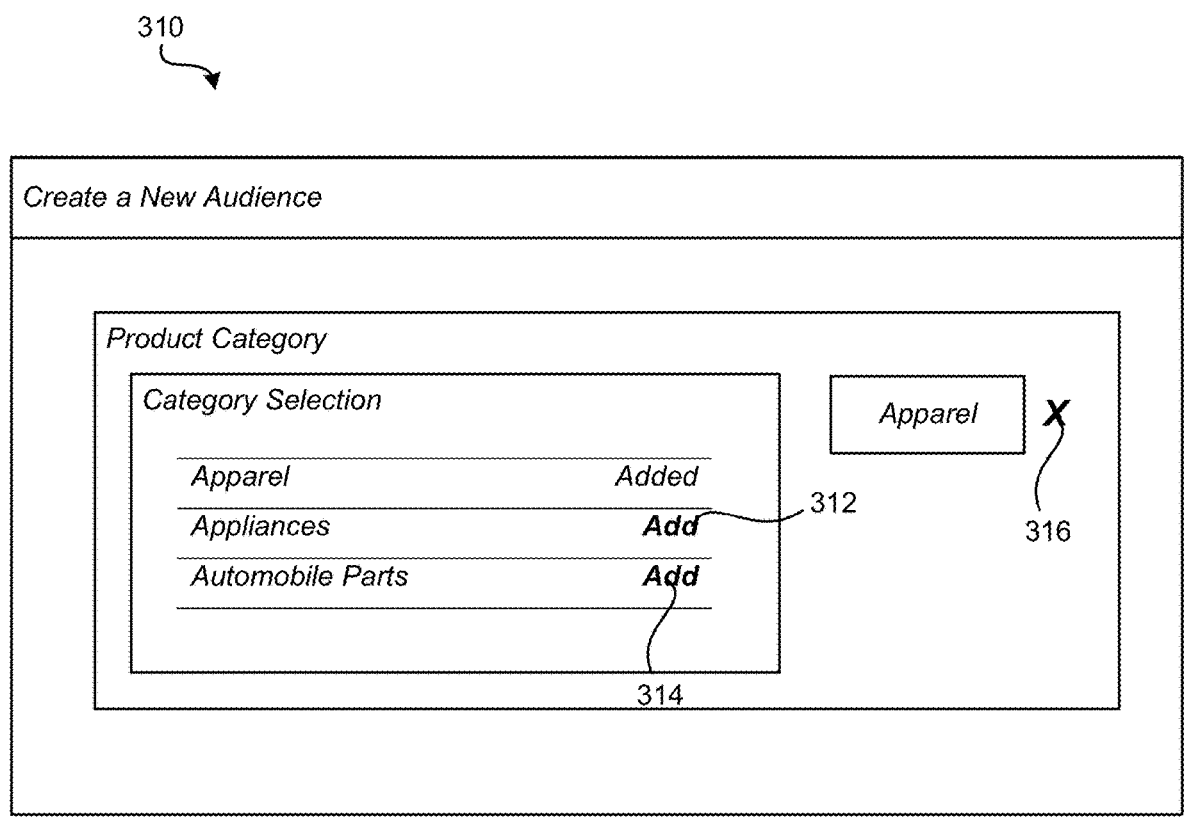

FIG. 3B illustrates a second page 310 of the user interface according to an implementation. The second page 310 includes second selection elements 312 to 316 that can correspond to selectable item categories corresponding to the target audience. As illustrated in FIG. 3B, the second selection elements 312 to 316 include a first addition element 312, a second addition element 314, and a first deletion element 316. Using the first and second addition elements 312 and 314, the provider can select item categories (e.g., "appliances" and/or "automobile parts") corresponding to items that the target audience has previously interacted with. Using the first deletion element 316, the provider can exclude item categories (e.g., "apparel") corresponding to items that the target audience has previously interacted with.

In the implementation illustrated in FIG. 3B, the provider has selected an item category corresponding to "apparel," because the Z Shoes fall within the apparel category. As a result of the provider's selection, an audience including consumer identifiers for consumer accounts that have interacted with items in the apparel category via the online marketplace can be generated.

Figure 3C:
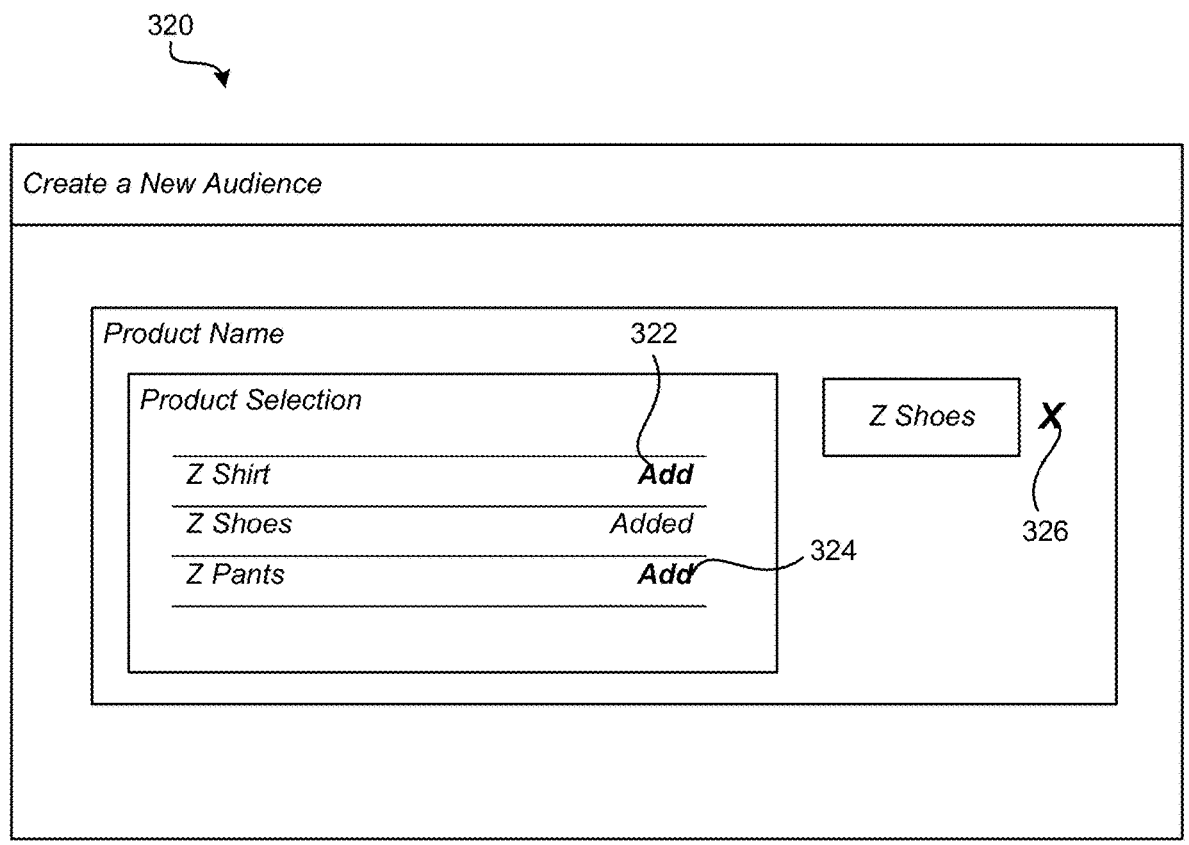

FIG. 3C illustrates a third page 320 of the user interface according to an implementation. The third page 320 includes third selection elements 322 to 326 that can correspond to selectable item categories corresponding to the target audience. As illustrated in FIG. 3C, the third selection elements 322 to 326 include a third addition element 322, a fourth addition element 324, and a second deletion element 326. Using the third and fourth addition elements 322 and 324, the provider can select item identifiers (e.g., item names, such as "Z shirt" and/or "Z pants") corresponding to items that the target audience has previously interacted with. Using the second deletion element 326, the provider can exclude item identifiers (e.g., "Z shoes") corresponding to items that the target audience has previously interacted with.

In the implementation illustrated in FIG. 3C, the provider has selected an item identifier corresponding to "Z shoes." As a result of the provider's selection, an audience including consumer identifiers for consumer accounts that have interacted with Z shoes via the online marketplace can be generated.

Figure 3D:
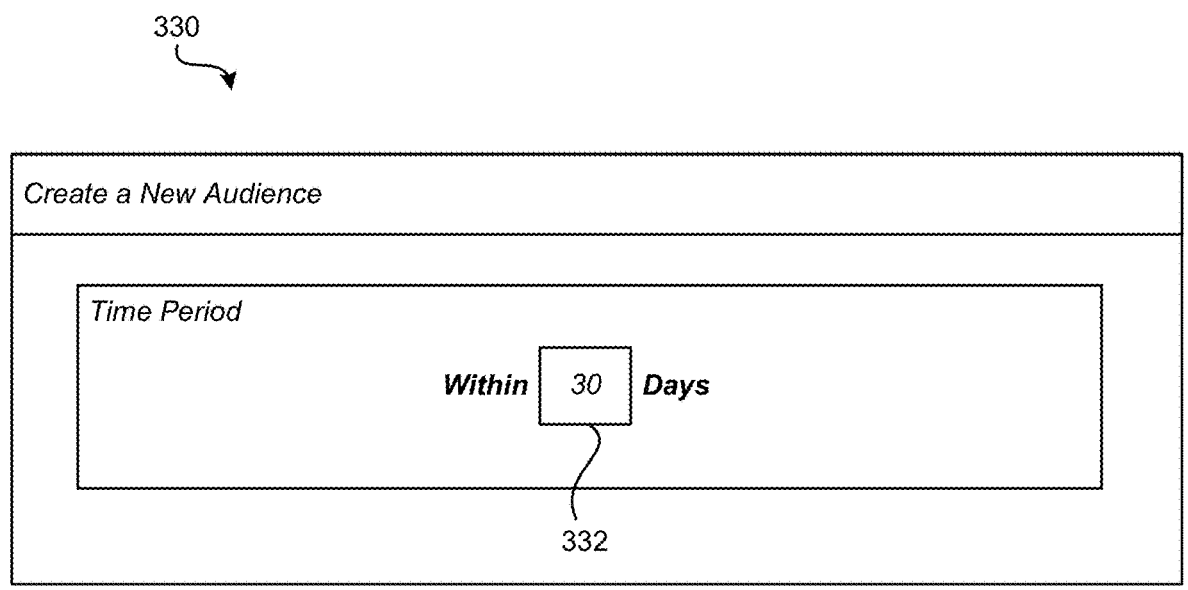

FIG. 3D illustrates a fourth page 330 of the user interface according to an implementation. The fourth page 330 includes a fourth selection element 332 that can correspond to a selectable time period corresponding to the target audience. As illustrated in FIG. 3D, the fourth selection element 332 includes a text box by which the provider can input a time period of the interactions between the target audience and the items.

In the implementation illustrated in FIG. 3C, the provider has selected a time identifier specifying a time interval of within the past 30 days of the selection. As a result of the provider's selection, an audience including consumer identifiers for consumer accounts that have interacted with items via the online marketplace within the past 30 days can be generated.

Figure 3E:
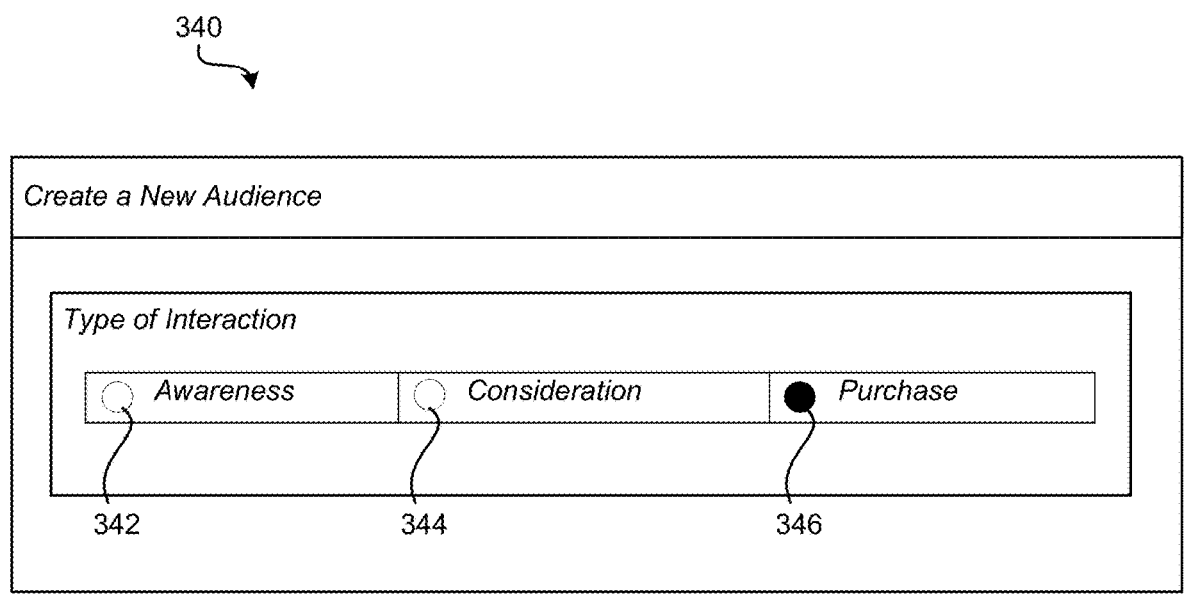

FIG. 3E illustrates a fifth page 340 of the user interface according to an implementation. The fifth page 340 includes fifth selection elements 342 to 346 that can correspond to selectable interaction identifiers corresponding to the target audience. As illustrated in FIG. 3E, the fifth selection elements 342 to 346 include a first button 342, a second button 344, and a third button 446. Using the fifth selection elements, the provider can select interaction identifiers (e.g., "Awareness," "Consideration," and/or "Purchase") corresponding to interactions that the target audience had with items.

In the implementation illustrated in FIG. 3E, the provider has selected "purchase" as an interaction identifier. As a result of the provider's selection, an audience including consumer identifiers for consumer accounts that have purchased items via the online marketplace can be generated.

The user interface can enable the provider to select various features or characteristics of a customizable audience for a particular media campaign. When the provider selects "Brand A" as the item source, "apparel" as the item category, "Z shoes" as the item identifier, "30 days" as the time identifier, and "purchase" as the interaction identifier, an audience of consumer identifiers that have purchased Brand A's Z shoes within the past 30 days via the online marketplace can be generated.

In particular implementations, any of the first page 300, the second page 310, the third page 320, the fourth page 330, and the fifth page 340 can be combined into a single window of the user interface. In certain implementations, any of the first page 300, the second page 310, the third page 320, the fourth page 330, and the fifth page 340 can be provided in separate windows of the user interface. In some implementations, the first page 300, the second page 310, the third page 320, the fourth page 300, and the fifth page 340 are displayed successively in a particular order on one or more provider devices.

In certain examples, the selection of one first characteristic on one page can cause a narrowed set of second characteristics on a second page. For example, by selecting "Brand A" as the item source on the first page 300, the second page 310 may only allow selection of items that are sourced from Brand A. That is, Z shirt, Z pants, and Z shoes may be items that are sold or manufactured by Brand A. Items that are not sold or manufactured by Brand A may not be available for selection on the second page 310.

In various examples, any of the types of selectable elements illustrated in FIGS. 3A to 3E can be substituted for one another. In particular implementations, any of the selectable elements can include at least one of text boxes, buttons, drop-down menus, toggles, sliders, icons, or any other suitable user interface elements known in the art.

Figure 4:
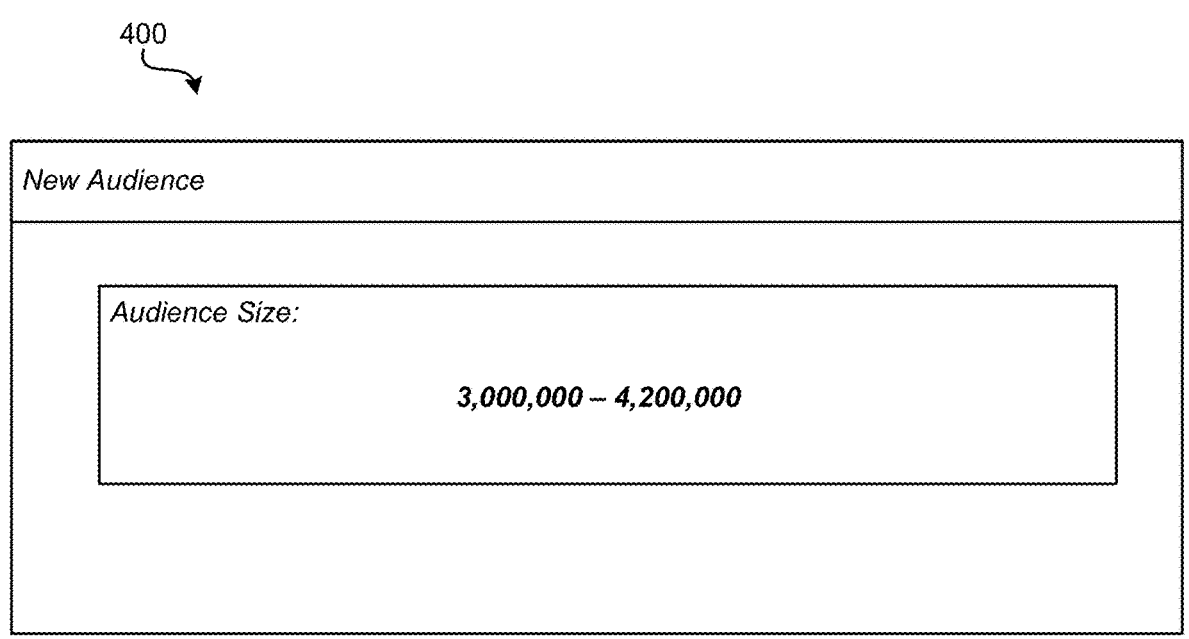
FIG. 4 illustrates a page of a user interface that illustrates an indication of an audience according to an implementation.

FIG. 4 illustrates a page 400 of a user interface that illustrates an indication of an audience according to an implementation. In some examples, page 400 may be a page displayed on the user interface illustrated by FIGS. 3A to 3E in response to the provider selecting various characteristics of the target audience. For example, page 400 may indicate the size of the audience of consumer identifiers that have purchased Brand A's Z shoes within the past 30 days via the online marketplace.

Page 400 may be output on a provider device, such as any of the provider device(s) 106 described above with reference to FIG. 1. As illustrated in FIG. 4, the indication is a range including the true audience size. For example, the true audience size may be 4,000,000, and the page may display a range of 3,000,000 to 4,200,000.

Page 400 can enable the provider to use the indication of the audience size to assess whether to proceed with a media campaign targeted to the specified audience. The audience size may allow the provider to assess whether the media campaign would be too expensive to deploy (e.g., the audience size may be too big). The audience size may allow the provider to assess whether the media campaign would be too insignificant to deploy (e.g., the audience size may be too small). In some cases in which the audience size is too big or too small to achieve certain goals of the media campaign, the provider may adjust the audience size by changing the characteristics of the audience. For example, the provider may select different characteristics than were previously selected in FIGS. 3A to 3E. Alternatively, the provider may determine that the audience size is suitable to achieve the goals of the media campaign, and may proceed with the media campaign.

Figure 5:
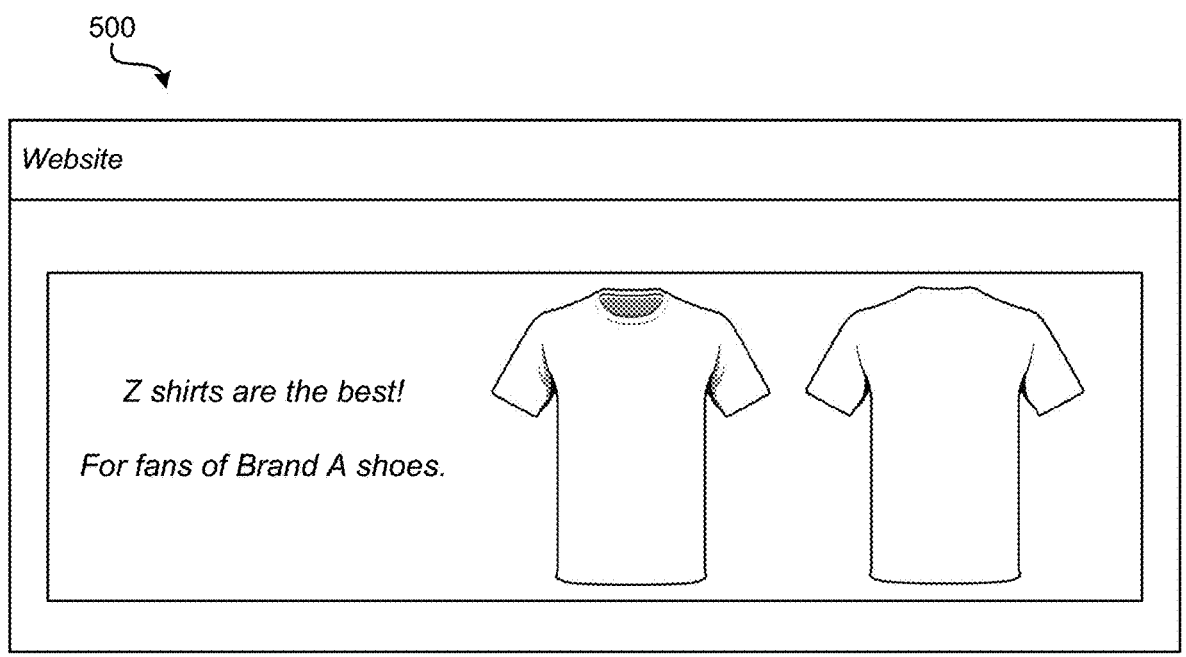
FIG. 5 illustrates a user interface displaying a media item according to an implementation.

FIG. 5 illustrates a page 500 of a user interface displaying a media item 502 according to an implementation. The page 500 can be provided on a consumer device, such as any of the consumer device(s) 102 described above with reference to FIG. 1. In various implementations, the media item 502 may be part of a media campaign initiated by a provider.

In some examples, the page 500 is provided on a consumer device associated with a consumer account that is selected as part of a target audience for the media item 502. As illustrated in FIG. 5, the media item 502 may be an image, such as a banner image. In some implementations, the media item 502 can be a multimedia element that is displayed, played, or otherwise output via the page 500. With reference to the examples described above with reference to FIGS. 3A to 3B and 4, the consumer device displaying page 500 may be associated with a consumer account that has purchased Brand A's Z shoes within the past 30 days via the online marketplace. In other examples, the consumer device may have previously interacted with items according to other characteristics or features specified by a provider.

Figure 6A:
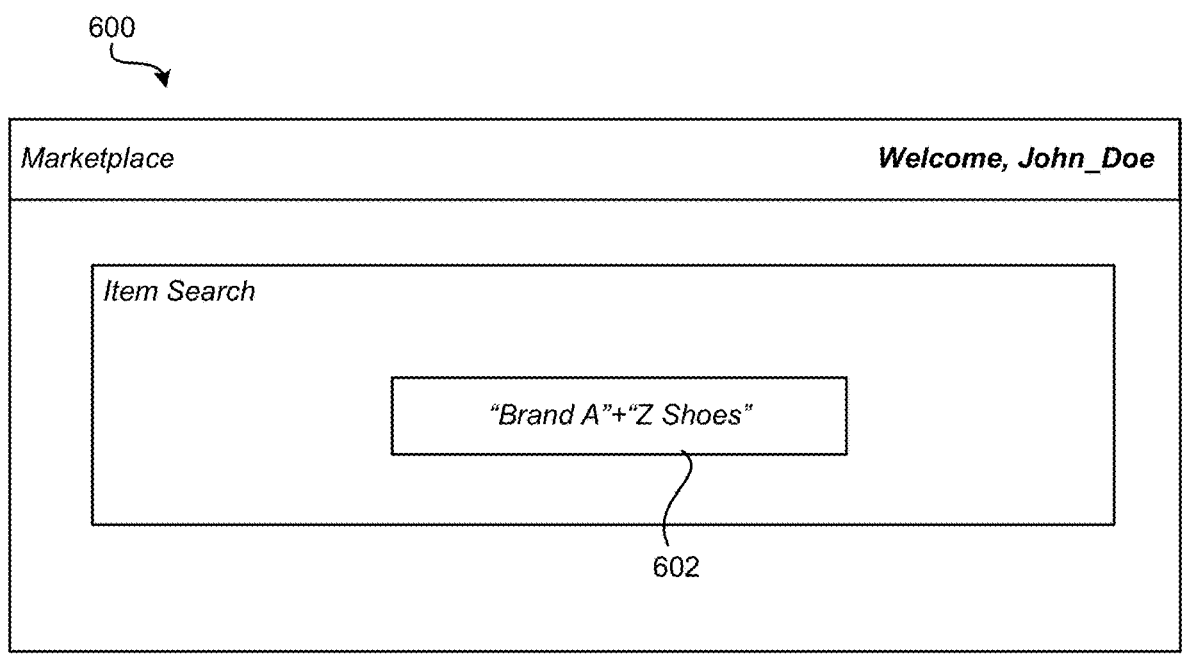
FIGS. 6A and 6B illustrate pages of a user interface by which a consumer account can interact with items in an online marketplace according to an implementation.
Figure 6B:
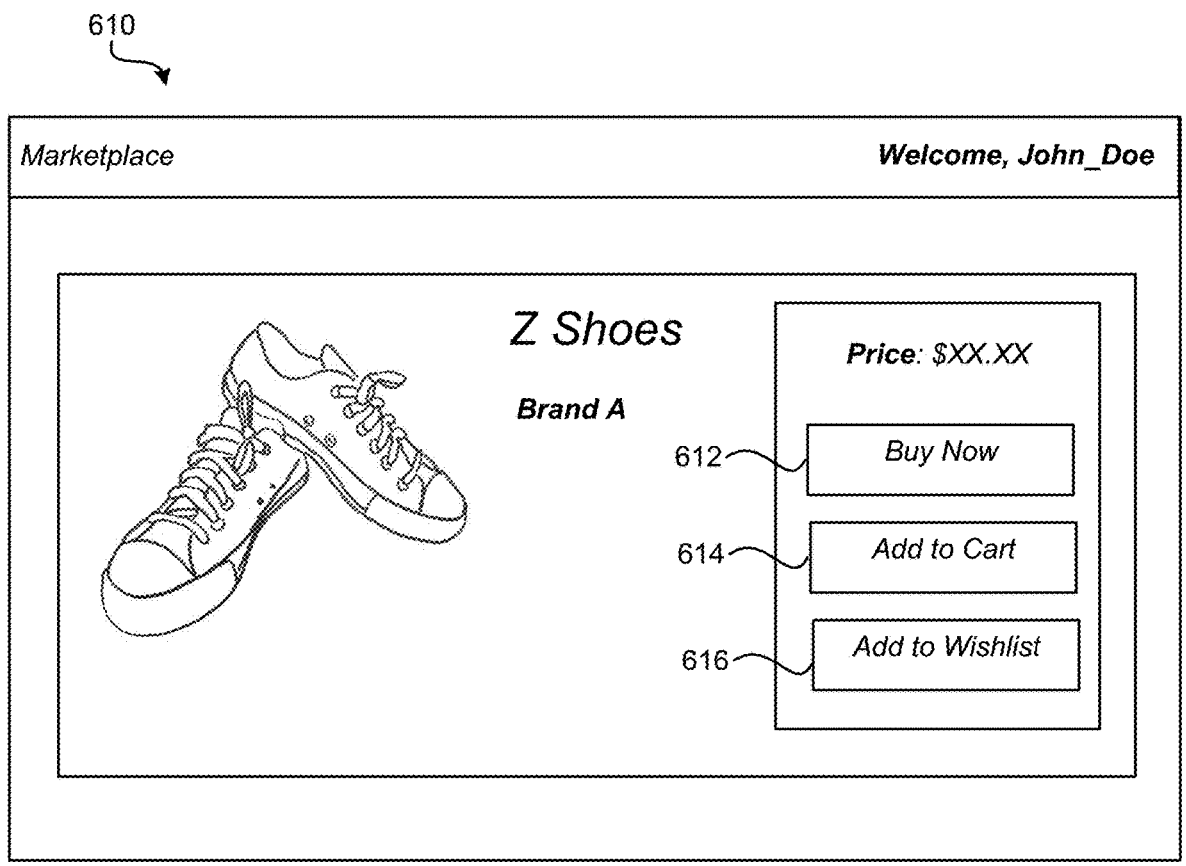

FIGS. 6A and 6B illustrate pages of a user interface by which a consumer account (e.g., consumer account John_Doe) can interact with items in an online marketplace according to an implementation. In some implementations, the user interface 600 can be provided on a consumer device, such as any of the consumer device(s) 102 described above with reference to FIG. 1.

FIG. 6A illustrates a first page 600 of the user interface according to an implementation. The first page 600 includes a selectable element, which is a search bar 602 by which a user can input keywords. In some implementations, the keywords can include strings that are separated by a space or a "+" character, and/or may be strings that are surrounded by quotation marks. In some examples, the keywords can be derived from the search bar 602 according to Boolean operators. In the example illustrated in FIG. 6A, consumer account John_Doe has input two keywords into the search bar 602: "Brand A" and "Z Shoes."

When a search according to the keywords in the search bar 602 is executed, an event corresponding to the search can be generated. In the example illustrated in FIG. 6A, the event may correspond to a "search" or an "awareness-type" interaction between consumer account John_Doe and Z Shoes sourced by Brand A.

With reference to examples discussed above with reference to FIGS. 3A to 3B, 4, and 5, the event corresponding to the search may not trigger the inclusion of a consumer identifier associated with John_Doe in an audience of consumer identifiers that have purchased Brand A's Z shoes within the past 30 days via the online marketplace. However, if "awareness" is selected as an interaction identifier by the provider, an event generated based on John_Doe's search for Z Shoes may cause a consumer identifier associated with John_Doe to be included in the specified audience.

FIG. 6B illustrates a second page 610 of the user interface according to an implementation. The second page 610 may correspond to a specific item (e.g., Z shoes) offered for sale on an online marketplace.

The second page 610 includes multiple selectable elements including a purchase selectable element 612 and first and second consideration selectable elements 614 and 616. By selecting the purchase selectable element 612, the consumer account may purchase the item, and an event corresponding to the purchase of the item may be reported to a targeted media delivery system. By selecting either or both of the first and second consideration selectable element, an event corresponding to the consideration of the item may be reported to the targeted media delivery system.

With reference to examples discussed above with reference to FIGS. 3A to 3B, 4, and 5, the event corresponding to the selection of purchase selectable element 612 may trigger the inclusion of a consumer identifier associated with John_Doe in an audience of consumer identifiers that have purchased Brand A's Z shoes within the past 30 days via the online marketplace. However, the selection of either of the consideration selectable elements 614 or 616, alone, may not trigger the inclusion of the consumer identifier in the specified audience.

Figure 7:
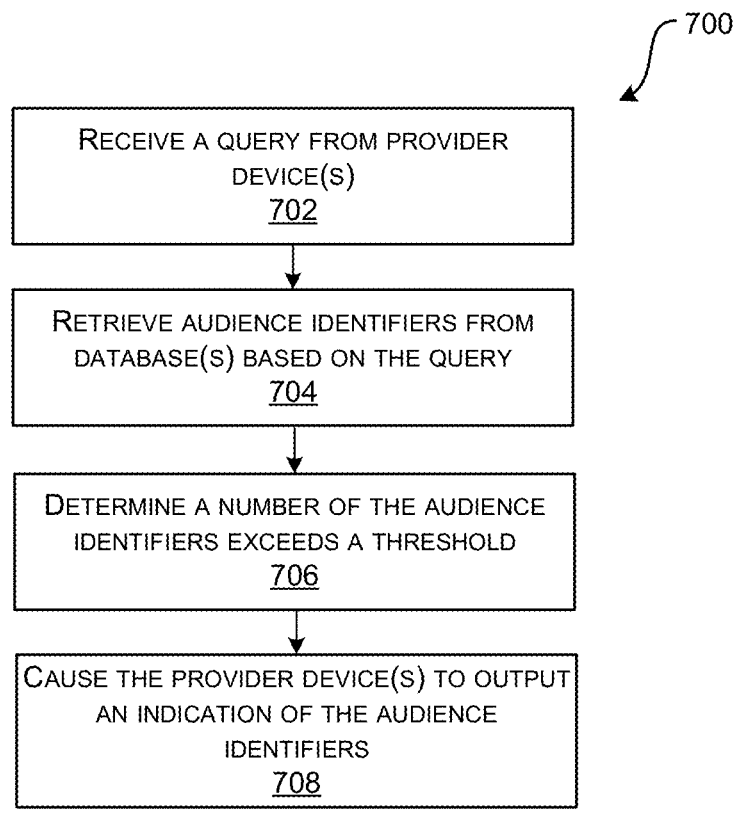
FIG. 7 illustrates a process for identifying a target audience based on previous interactions with items according to an implementation.
Figure 8:
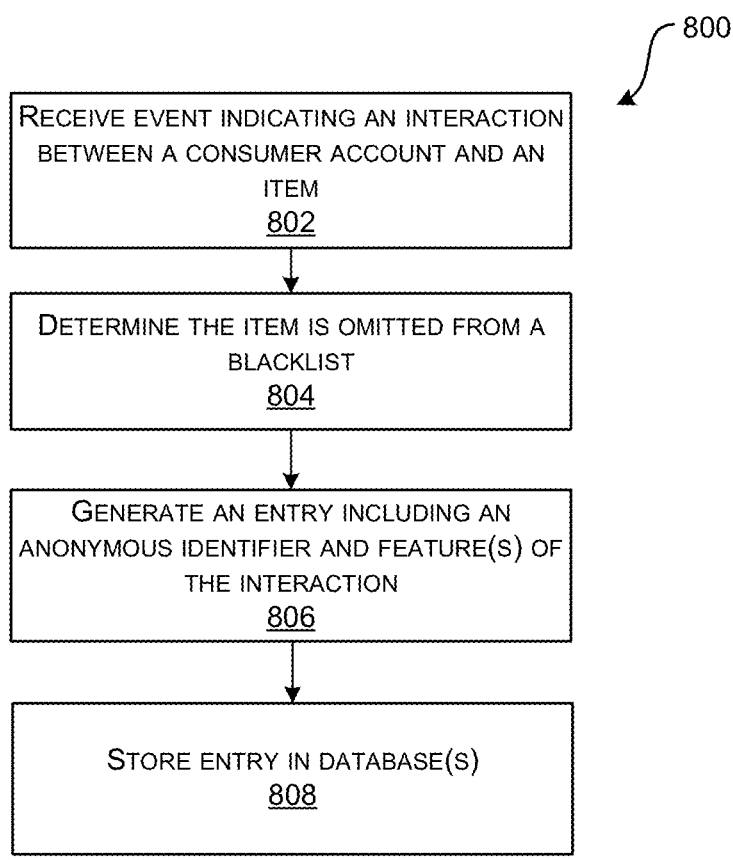
FIG. 8 illustrates a process for pre-processing events for generating a target audience according to an implementation.
Figure 9:
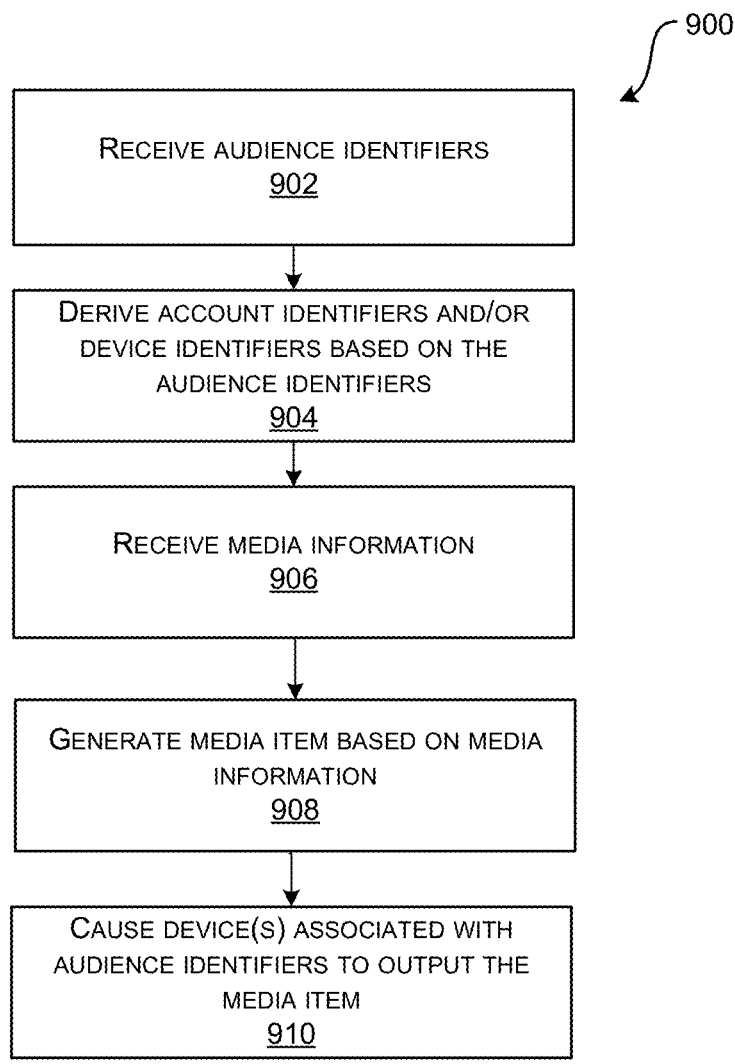
FIG. 9 illustrates a process for carrying out a targeted media campaign according to an implementation.

FIGS. 7-9 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some implementations, operations can be omitted or added from the processes.

FIG. 7 illustrates a process 700 for identifying a target audience based on previous interactions with items according to an implementation. In some implementations, process 700 can be performed by a targeted media delivery system (such as the targeted media delivery system 104 described with reference to FIG. 1), by an audience builder (such as the audience builder 112 described above with reference to FIG. 1), or other devices.

At 702, a query is received from one or more provider devices. In some examples, the query indicates at least one characteristic of a set of interactions between consumer accounts and items offered for sale via an online marketplace. The characteristic(s) may include at least one of a category of the items, a source of the items, an identifier of the items, or a time of the interactions.

According to some implementations, the query may indicate that at least one selection element corresponding to the at least one characteristic has been selected on a user interface output by the provider device(s). In some examples, the selection element(s) can include at least one of a text box, a button, a drop-down menu, a toggle, a slider, an icon, or any other type of suitable user interface element.

At 704, audience identifiers are retrieved from one or more databases based on the query. In particular implementations, the database(s) may store entries corresponding to previous interactions between consumer accounts and items offered for sale via the online marketplace. The entries may be prestored, in some examples. The audience identifiers may correspond to a set of consumer accounts that have previously interacted with one or more of the items according to the at least one characteristic.

At 706, a number of the audience identifiers is determined to exceed a threshold. The threshold may be predetermined. In some cases, the threshold can be at least one of 1,000 audience members, 10,000 audience members, 100,000 audience members, or 1,000,000 audience members.

At 708, the process 700 includes causing the provider device(s) to output an indication of the audience identifiers. In some examples, the indication is a range that includes the number of the audience identifiers.

As a result of the process 700, the provider device(s) may request and receive information on a target audience defined according to previous consumer behavior. In some cases, process 700 may allow a provider to determine whether to initiate a media campaign for the target audience.

FIG. 8 illustrates a process 800 for pre-processing events for generating a target audience according to an implementation. In some implementations, process 800 can be performed by a targeted media delivery system (such as the targeted media delivery system 104 described with reference to FIG. 1), by an event manager (such as the event manager 108 described above with reference to FIG. 1), or other devices.

At 802, an event indicating an interaction between a consumer account and an item may be received. The event may be part of a stream of events, for example. In various implementations, the interaction may be at least one of the consumer account utilizing a search term associated with the item, the consumer account viewing a webpage associated with the item, saving an indication of the item in a saved items list, adding an indication of the item to a virtual shopping cart, or purchasing the item.

At 804, the item may be determined to be omitted from a blacklist. The blacklist may be a predetermined list of sensitive items that are to be excluded from consideration in building an audience. For example, the blacklist may include a list of health-related items.

At 806, an entry including an anonymous identifier and one or more features of the interaction may be generated. In some examples, the anonymous identifier is generated by inputting an account identifier of the consumer account into a cryptographic hash function. The features of the interaction may include various features related to the item, to the time of the interaction, and to the type of interaction. For example, the features may include an item identifier that uniquely identifies the item, an item source that uniquely identifies a brand or entity offering the item for sale on the online marketplace, an item category that identifies a group of similar items including the item, and the like. The features may include a time identifier that identifies any of a time of day of the interaction, a date of the interaction, a time of the interaction defined by the 24- or 12-hour clock, and the like. The type of interaction may be any of an awareness of the item, a consideration of the item, a purchase of the item, and the like.

The entry may be stored in one or more databases at 808. The entry can be stored as one of multiple entries stored in the database(s). In some examples, the entries are stored prior to a process of building an audience using the entries.

As a result of the process 800, a system may pre-process events corresponding to interactions between consumers and items via an online marketplace as the interactions are occurring. Subsequently, when a target audience is specified and requested, indicators of members of the audience can be retrieved quickly from the database(s).

FIG. 9 illustrates a process 900 for carrying out a targeted media campaign according to an implementation. In some implementations, process 900 can be performed by a targeted media delivery system (such as the targeted media delivery system 104 described with reference to FIG. 1), by a media provider (such as the media provider 114 described above with reference to FIG. 1), or other devices.

At 902, audience identifiers are received. The audience identifiers may indicate a set of consumer accounts that have previously interacted with one or more items via an online marketplace according to one or more specified characteristics. In some cases, the audience identifiers are anonymous identifiers of the set of consumer accounts.

At 904, account identifiers and/or device identifiers are derived based on the audience identifiers. In particular implementations, the account identifiers and/or device identifiers are derived by de-anonymizing the audience identifiers. In certain cases, the device identifiers indicate devices utilized by the consumer accounts indicated by the account identifiers. The audience identifiers may be de-anonymized, in some examples, by transmitting the audience identifiers to a device that maintains a table of anonymous identifiers and associated account and device identifiers and, in response, receiving the de-anonymized account identifiers and/or device identifiers from the device. In certain examples, the table is stored locally, and de-anonymizing the audience identifiers involves looking up the account and/or device identifiers in the table.

Media information is received at 906. In some examples, the media information includes at least one of an image, audio, a video, a string, or a hyperlink.

At 908, a media item is generated based on the media information. In some examples, the media item is defined by the media information. In certain examples, the media information provides a location (e.g., a website address) where the media item can be retrieved. In some implementations, the media item is a combination of different types of media specified in the media information. For example, the media item can be a video banner embedded with a hyperlink.

At 910, the process 900 includes causing one or more devices associated with the audience identifiers to output the media item. In some examples, the media item is output to consumer accounts identified by the account identifiers. In certain cases, the media item is output to devices identified by the device identifiers.

As a result of process 900, a media item can be output to multiple accounts or devices in a target audience.

Figure 10:
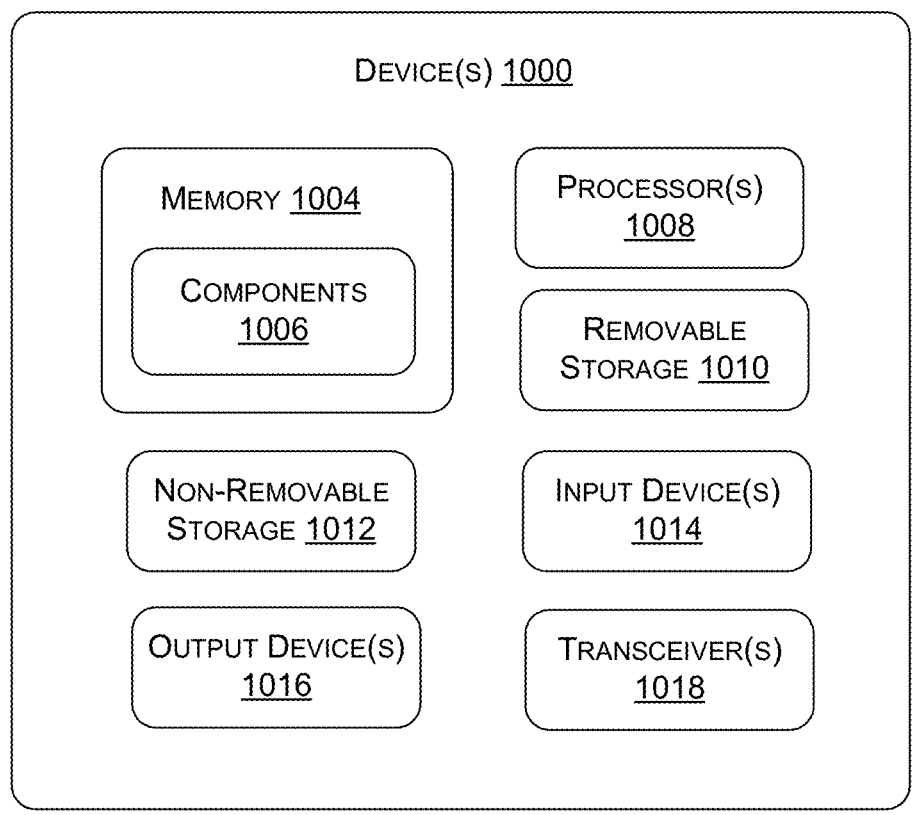
FIG. 10 is a block diagram conceptually illustrating example components of one or more devices.

FIG. 10 is a block diagram conceptually illustrating example components of one or more devices 1000. The device(s) 1000 illustrated in FIG. 10 may be an example of a device that includes or is included in a consumer device (such as any of the consumer device(s) 102), a targeted media delivery system (such as the targeted media delivery system 104), an event manager (such as the event manager 108), a device storing one or more databases (such as the database(s) 110 and/or 200), an audience builder (such as the audience builder 112), a media provider (such as the media provider 114), and/or a provider device (such as any of the provider device(s) 106). In some embodiments, some or all of the functionality discussed in connection with FIGS. 1-9 can be implemented in the device(s) 1000. Further, the device(s) 1000 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 1000 can be implemented as a single device or as a plurality of devices with components and data distributed among them.

In some examples, the device(s) 1000 can be implemented as any suitable type of computing device configured including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

As illustrated, the device(s) 1000 comprise a memory 1004 storing components 1006 to provide functionality to the device 1000 to facilitate targeted audience building, as described herein. In various embodiments, the memory 1004 may also comprise additional functions and structures that are not explicitly described herein. Also, the device 1000 includes processor(s) 1008, at least one removable storage 1010 and at least one non-removable storage 1012, input device(s) 1014, output device(s) 1016, and transceiver(s) 1018.

In various embodiments, the memory 1004 is volatile (such as random access memory (RAM)), non-volatile (such as read-only memory (ROM), flash memory, etc.) or some combination of the two. The components 1006 can comprise methods, threads, processes, applications or any other sort of executable instructions. The components 1006 can also include files and databases.

In some embodiments, the processor(s) 1008 is a central processing unit (CPU), a graphics processing unit (GPU), or both CPU and GPU, or other processing unit or component known in the art.

The device 1000 also includes additional data storage devices (removable and/or non-removable) such as, for example, magnetic disks, optical disks, or tape. Such additional storage is illustrated in FIG. 10 by removable storage 1010 and non-removable storage 1012. Tangible computer-readable media can include volatile and nonvolatile, removable and non-removable media implemented in any method or technology for storage of information, such as computer readable instructions, data structures, program modules, or other data. Memory 1004, removable storage 1010 and non-removable storage 1012 are all examples of computer-readable storage media. Computer-readable storage media include, but are not limited to, RAM, ROM, electrically erasable programmable ROM (EEPROM), flash memory or other memory technology, compact disk ROM (CD-ROM), digital versatile discs (DVDs), content-addressable memory (CAM), or other optical storage, magnetic cassettes, magnetic tape, magnetic disk storage or other magnetic storage devices, or any other medium which can be used to store the desired information and which can be accessed by the device 1000. Any such tangible computer-readable media can be part of the device 1000.

The device 1000 also can include input device(s) 1014, such as a keypad, a cursor control, a touch-sensitive display, voice input device, etc., and output device(s) 614 such as a display, speakers, printers, etc. These devices are well known in the art and need not be discussed at length here.

As illustrated in FIG. 10, the device 1000 also includes one or more wired or wireless transceiver(s) 1018. For example, the transceiver(s) 1018 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 1018 can utilize multiple-input/multiple-output (MIMO) technology. The transceiver(s) 1018 can comprise any sort of wireless transceivers capable of engaging in wireless, radio frequency (RF) communication. The transceiver(s) 1018 can also include other wireless modems, such as a modem for engaging in Wi-Fi, WiMAX, Bluetooth, or infrared communication.

In some examples in which the device 1000 includes at least a portion of component in an environment (e.g., the environment 100), the device 1000 can use the transceiver(s) 1018 to communicate with other components in the environment over one or more networks. The networks may include one or more wireless networks and/or one or more wired networks.

Various environments and elements described herein may, of course, include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A targeted media delivery system comprising:
one or more processors; and
at least one memory storing computer-executable instructions that, when executed, cause the one or more processors to perform acts comprising:
receiving an event stream that includes events indicative of previous interactions between consumer accounts and items offered for sale via an online marketplace;
pre-processing the events to discard one or more of the events associated with a particular item and to derive, from the events that were maintained, consumer identifiers associated with the consumer accounts, item identifiers associated with the items other than the particular item, and time identifiers indicating times of the previous interactions;
storing entries corresponding to the previous interactions in at least one database, the entries indexed by the consumer identifiers and comprising the consumer identifiers, the item identifiers, and the time identifiers;
causing a provider device to output a user interface comprising selection elements corresponding to characteristics of a target audience, the characteristics comprising a selectable item and a selectable time period;
receiving, from the provider device via the selection elements of the user interface, a query that indicates selection of a selected item and a selected time period;
retrieving, from the at least one database, audience identifiers comprising a set of the consumer identifiers corresponding to a set of the consumer accounts that have interacted with the selected item during the selected time period;
causing the provider device to output an indication of a number of the audience identifiers;
receiving, from the provider device, media information indicative of a media item, the media information comprising at least one of an image file, an audio file, a video file, a string, or a hyperlink indicating a location of the media item; and
causing at least one consumer device associated with the audience identifiers to output the media item.

2. The system of claim 1, wherein the consumer identifiers are anonymous identifiers of the consumer accounts, and
wherein the acts further comprise:
determining the at least one consumer device based at least in part on the set of consumer accounts.

3. The system of claim 1, wherein the pre-processing of the events comprises:
determining that the items other than the particular item are omitted from a blocked list that comprises a list of health-related items.

4. The system of claim 1, wherein the acts further comprise:
determining that the number of the audience identifiers exceeds a threshold; and
causing the provider device to output an indication of a range that comprises the number of the audience identifiers.

5. A system comprising:
one or more processors; and
at least one memory storing computer-executable instructions that, when executed, cause the one or more processors to perform acts comprising:
receiving an event stream that includes events indicative of previous interactions between consumer accounts and items offered by an online marketplace;
pre-processing the events to discard one or more of the events associated with a particular item and to derive, from the events that were maintained, consumer identifiers associated with the consumer accounts, item identifiers associated with the items other than the particular item, and time identifiers indicating times of the previous interactions;
storing entries corresponding to the previous interactions in at least one database, the entries indexed by the consumer identifiers and comprising the consumer identifiers, the item identifiers, and the time identifiers;
receiving, from at least one provider device, a query that indicates (i) a first selection, at a user interface of the at least one provider device, of a selected item, and (ii) a second selection, at the user interface, of a selected time period;
retrieving, from the at least one database, audience identifiers indicating a set of the consumer identifiers corresponding to a set of the consumer accounts that have interacted with the selected item during the selected time period; and
causing the at least one provider device to output an indication of the set of the consumer identifiers.

6. The system of claim 5, wherein the user interface comprises a graphical user interface output by the at least one provider device.

7. The system of claim 5, wherein the query further indicates a third selection, at the user interface, of at least one of a category of the selected item, or a source of the selected items.

8. The system of claim 5 wherein the audience identifiers are anonymous identifiers of the set of consumer identifiers, and
wherein the acts further comprise:
determining at least one consumer device based at least in part on the audience identifiers.

9. The system of claim 5, wherein the audience identifiers are prestored in the at least one database prior to receiving the query.

10. The system of claim 5, wherein the items other than the particular item are omitted from a blocked list that comprises a list of health-related items.

11. The system of claim 5, wherein the acts further comprise:
receiving, from the at least one provider device, media information that comprises at least one of an image, audio, a video, a string, or a hyperlink; and
causing at least one consumer device associated with the audience identifiers to output a media item based at least in part on the media information.

12. The system of claim 5, wherein the acts further comprise:
determining that a number of the audience identifiers exceeds a threshold, and
wherein the indication of the set of the consumer identifiers is a range comprising the number of the audience identifiers.

13. A method comprising:
receiving an event stream that includes events indicative of previous interactions between consumer accounts and items offered by an online marketplace;
pre-processing the events to discard one or more of the events associated with a particular item and to derive, from the events that were maintained, consumer identifiers associated with the consumer accounts, item identifiers associated with the items other than the particular items, and time identifiers indicating times of the previous interactions;
storing entries corresponding to the previous interactions in at least one database, the entries indexed by the consumer identifiers and comprising the consumer identifiers, the item identifiers, and the time identifiers;
receiving, from at least one provider device, a query that indicates (i) a first selection, at a graphical user interface (GUI), of a selected item; (ii) a second selection, at the GUI, of at least one characteristic of interactions between the consumer accounts and the selected items;
retrieving, from the at least one database, audience identifiers indicating a set of the consumer identifiers corresponding to a set of the consumer accounts that have interacted with the selected item according to the at least one characteristic; and
causing the at least one provider device to output an indication of the audience identifiers at the GUI.

14. The method of claim 13, wherein receiving the query comprises receiving an indication that at least one selection element corresponding to the at least one characteristic has been selected on the GUI.

15. The method of claim 13, wherein the at least one characteristic comprises at least one of a category of the selected item, a source of the selected item, an identifier of the selected item, or a time of the interactions.

16. The method of claim 13, wherein the audience identifiers are anonymous identifiers of the consumer accounts, and
wherein the method further comprises:
determining at least one consumer device based at least in part on the audience identifiers.

17. The method of claim 13, wherein the audience identifiers are prestored in the at least one database prior to receiving the query.

18. The method of claim 13, wherein the items other than the particular item are omitted from a blocked list that comprises a list of health-related items.

19. The method of claim 13, further comprising:
receiving, from the at least one provider device, media information that comprises at least one of an image, audio, a video, a string, or a hyperlink; and
causing at least one consumer device associated with the audience identifiers to output a media item based at least in part on the media information.

20. The method of claim 13, further comprising:
determining that a number of the audience identifiers exceeds a threshold, and
wherein the indication of the audience identifiers is a range comprising the number of the audience identifiers.

* * * * *